US011533258B2

(12) United States Patent
Gandhi et al.

(10) Patent No.: US 11,533,258 B2
(45) Date of Patent: *Dec. 20, 2022

(54) IN-SITU PASSIVE PERFORMANCE MEASUREMENT IN A NETWORK ENVIRONMENT

(71) Applicant: Cisco Technology, Inc., San Jose, CA (US)

(72) Inventors: Rakesh Gandhi, Stittsville (CA); Clarence Filsfils, Brussels (BE); Sagar Soni, Ottawa (CA); Patrick Khordoc, Ottawa (CA)

(73) Assignee: CISCO TECHNOLOGY, INC., San Jose, CA (US)

(*) Notice: Subject to any disclaimer, the term of this patent is extended or adjusted under 35 U.S.C. 154(b) by 9 days.

This patent is subject to a terminal disclaimer.

(21) Appl. No.: 17/130,336

(22) Filed: Dec. 22, 2020

(65) Prior Publication Data
US 2021/0111999 A1   Apr. 15, 2021

Related U.S. Application Data

(63) Continuation of application No. 16/243,409, filed on Jan. 9, 2019, now Pat. No. 10,917,340.
(Continued)

(51) Int. Cl.
*G06F 11/00* (2006.01)
*H04L 45/00* (2022.01)
(Continued)

(52) U.S. Cl.
CPC .......... *H04L 45/70* (2013.01); *H04L 43/0847* (2013.01); *H04L 45/50* (2013.01);
(Continued)

(58) Field of Classification Search
CPC .................. C08G 59/4261; C08G 59/4035; C08G 59/42; C08J 5/243; C08J 2363/00;
(Continued)

(56) References Cited

U.S. PATENT DOCUMENTS 10,216,695 B1*  2/2019  Shankar .................. G06F 9/451
10,917,340 B2*  2/2021  Gandhi .................... H04L 45/50
(Continued)

OTHER PUBLICATIONS

C. Li et al., Network Working Group, "Passive Performance Measurement for SRv6 Network Programming draft-li-spring-passive-pm-for-srv6-np-00", Mar. 5, 2018, 17 pages.
(Continued)

*Primary Examiner* — Chuong T Ho
(74) *Attorney, Agent, or Firm* — Edell, Shapiro & Finnan, LLC

(57) ABSTRACT

Techniques for in-situ passive performance measurement are described. In one embodiment, a method includes receiving a data packet at a first network element, determining whether measurement information is to be collected for the data packet, providing one or more measurement fields for the data packet based on a determination that measurement information is to be collected for the data packet in which at least one measurement field identifies a measurement type, and forwarding the data packet to a second network element. The method further includes determining, by the second network element, the measurement type for the data packet, and performing one or more actions based on the measurement type.

20 Claims, 13 Drawing Sheets

Related U.S. Application Data

(60) Provisional application No. 62/729,620, filed on Sep. 11, 2018.

(51) Int. Cl.
*H04L 45/50* (2022.01)
*H04L 69/22* (2022.01)
*H04L 43/0823* (2022.01)
*H04L 47/20* (2022.01)
*H04L 45/74* (2022.01)

(52) U.S. Cl.
CPC .............. *H04L 45/66* (2013.01); *H04L 45/74* (2013.01); *H04L 47/20* (2013.01); *H04L 69/22* (2013.01)

(58) Field of Classification Search
CPC .... C08J 2451/00; C08J 5/042; C08J 2435/06; C08K 5/1539; C08K 7/02; C08L 63/00; B29B 11/16; B29K 2063/00; B29K 2105/0094
USPC .............................. 370/232, 231, 235, 235.1
See application file for complete search history.

(56) References Cited

U.S. PATENT DOCUMENTS

| | | |
|---|---|---|
| 2006/0285501 A1 | 12/2006 | Damm |
| 2013/0007275 A1 | 1/2013 | Li et al. |
| 2014/0369356 A1 | 12/2014 | Bryant et al. |
| 2015/0256456 A1 | 9/2015 | Previdi et al. |
| 2016/0099853 A1 | 4/2016 | Nedeltchev et al. |
| 2016/0099864 A1 | 4/2016 | Akiya et al. |
| 2017/0111209 A1 | 4/2017 | Ward et al. |
| 2017/0280340 A1 | 9/2017 | Zhu et al. |
| 2017/0324622 A1 | 11/2017 | Ubaldi et al. |
| 2018/0063018 A1 | 3/2018 | Bosch et al. |
| 2018/0091410 A1 | 3/2018 | Browne et al. |
| 2018/0092115 A1 | 3/2018 | Krasnyanskiy et al. |
| 2018/0176134 A1 | 6/2018 | Pignataro et al. |
| 2018/0270118 A1 | 9/2018 | Lee et al. |
| 2018/0295049 A1 | 10/2018 | Agarwal et al. |

OTHER PUBLICATIONS

S. Deering et al., "Internet Protocol, Version 6 (IPv6) Specification", Jul. 2017, Internet Engineering Task Force (IETF), ISSN: 2070-1721, 42 pages.

S. Bryant et al., "UDP Return Path for Packet Loss and Delay Measurement for MPLS Networks", Internet Engineering Task Force (IETF), ISSN: 2070-1721, Jul. 2016, 10 pages.

D. Frost et al., "Packet Loss and Delay Measurement for MPLS Networks", Internet Engineering Task Force (IETF), ISSN: 2070-1721, Sep. 2011, 52 pages.

A. Farrel et al., MPLS Working Group, "An MPLS-Based Forwarding Plane for Service Function Chaining draft-ietf-mpls-sfc-04", Nov. 20, 2018, 28 pages.

C. Filsfils et al., Network Working Group, "IPv6 Segment Routing Header (SRH) draft-ietf-6man-segment-routing-header-15", Oct. 22, 2018, 28 pages.

C. Filsfils et al., SPRING, "SRv6 Network Programming draft-filsfils-spring-srv6-network-programming-06", Oct. 22, 2018, 55 pages.

C. Filsfils et al., SPRING Working Group, "Segment Routing Policy Architecture draft-filsfils-spring-segment-routing-policy-06.txt", May 21, 2018, 34 pages.

R. Gandhi, Ed., "Segment Routing with MPLS Data Plane encapsulation for In-situ OAM Data", draft-gandhi-spring-oam-sr-mpls-00, SPRING Working Group, Internet-Draft, Intended status: Standards Track, Oct. 23, 2018, 7 pages.

Wikipedia, "Precision Time Protocol", Sep. 24, 2019, 9 pages.

F. Brockners, et al., "Data Fields for In-situ OAM draft-ietf-ippm-ioam-data-04." ippm, Internet-Draft, Intended status Standards Track, Oct. 20, 2018, 45 pages.

* cited by examiner

IN-SITU PASSIVE PERFORMANCE MEASUREMENT IN A NETWORK ENVIRONMENT

CROSS-REFERENCE TO RELATED APPLICATIONS

This application is a continuation of and claims the benefit of priority to U.S. patent application Ser. No. 16/243,409, entitled "IN-SITU PASSIVE PERFORMANCE MEASUREMENT IN A NETWORK ENVIRONMENT," filed on Jan. 9, 2019, and issued on Feb. 9, 2021 as U.S. Pat. No. 10,917,340, which application claims the benefit of priority under 35 U.S.C. § 119 to U.S. Provisional Patent Application Serial No. 62/729,620, entitled "IN-SITU PASSIVE PERFORMANCE MEASUREMENT AS A SERVICE FUNCTION CHAINING FOR SR-MPLS POLICIES," filed on Sep. 11, 2018, the disclosure of which applications are hereby incorporated by reference in their entirety.

TECHNICAL FIELD

The present disclosure relates to computer networking, in particular, to in-situ passive performance measurement in a network environment.

BACKGROUND

Segment-routing (SR) is a new technology that greatly simplifies network operations and makes networks Software Defined Network (SDN)-friendly. SR is applicable to data-planes such as the Multiprotocol Label Switching (MPLS) (typically referred to as 'SR-MPLS') data-plane and the Internet Protocol version 6 (IPv6) (typically referred to as 'SRv6') data-plane. Furthermore, SR technology is to be used with network slicing to provide services in 3rd Generation Partnership Project (3GPP) 5th Generation (5G) networks. For the new 5G networks, service providers are planning to deliver Ultra-Reliable Low-Latency Communication (URLLC) services. Traffic flows through 5G network paths are expected to satisfy certain constraints as defined in customer Service Level Agreements (SLAs). For example, services such as tele-medicine, on-line gaming, autonomous connected cars, stock market trading and many mission critical applications have strict end-to-end constraints. Determining constraint violations is an important aspect of this new technology.

DESCRIPTION OF EXAMPLE EMBODIMENTS

Overview

Figure 1:
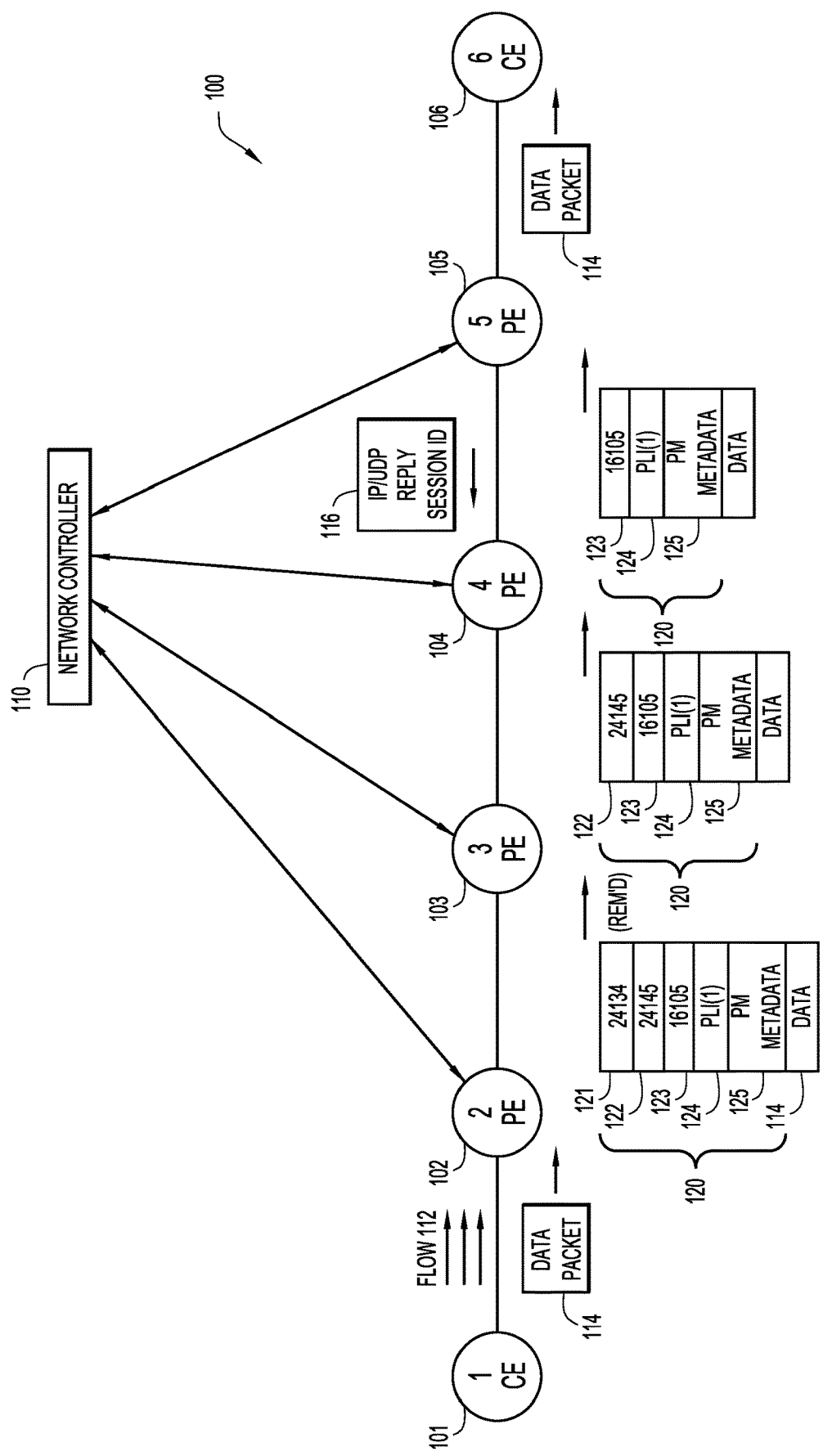
FIG. 1 is a simplified diagram illustrating a network in which techniques for in-situ passive performance measurement may be implemented, according to an example embodiment.

Presented herein are techniques to provide in-situ passive performance measurements in a network environment. A method is provided in one example embodiment and may include: receiving a data packet at a first network element; determining whether measurement information is to be collected for the data packet; providing one or more measurement fields for the data packet based on a determination that measurement information is to be collected for the data packet, wherein at least one measurement field identifies a measurement type; and forwarding the data packet to a second network element. The method may include determining, by the second network element, the measurement type for the data packet; and performing one or more actions at the second network element based on the measurement type.

In some cases, at least one other measurement field may include a policy indicator, and at least one other measurement field may include measurement metadata in which the one or more actions may include: collecting at least one of a receive time and a receive count value for the data packet; configuring a message; and transmitting the message to the first network element. The metadata may also include context information such as Session Identifier and an ingress node address (e.g., node address of the first network element) to uniquely identify the SR Policy for the in-situ performance measurement. The message sent to the first network element may include the policy indicator, at least a portion of the information included in the measurement metadata, at least one of the receive time and the receive count value collected for the data packet, and a node address of the second network element. In some instances, the policy indicator, the measurement type, and the measurement metadata are provided in a header of the data packet. In still some instances, the policy indicator and the measurement type are provided in a header of the data packet and the measurement metadata is provided before or after a data payload for the data packet. In some instances, the one or more measurement fields are provided in a Segment Routing Header for the data packet. The information included in the measurement metadata may include one or more of but not limited to: a Session Identifier; an ingress node address; a transmit time for the data packet; a traversed node address; a transmit count value for the data packet; and a sequence number.

In some cases in which the second network element is an egress network element for a provider network, the method may further include: removing the one or more measurement fields from the data packet; and forwarding the data packet to a third network element. In still some cases in which the second network element is an egress network element for a provider network, the method may further include communicating, by the egress network element, one or more policy indicators to the first network element, wherein at least one policy indicator is associated with a segment routing policy. In some cases, the first network element and the second network element are part of an Ethernet Virtual Private Network.

In another embodiment, one or more non-transitory computer readable storage media encoded with instructions are provided that, when executed by a processor, cause the processor to perform operations, comprising: receiving a data packet at a first network element; determining whether measurement information is to be collected for the data packet; providing one or more measurement fields for the data packet based on a determination that measurement information is to be collected for the data packet, wherein at least one measurement field identifies a measurement type; and forwarding the data packet to a second network element. In some cases, at least one other measurement field includes a policy indicator and at least one other measurement field includes measurement metadata. In some instances, the policy indicator, the measurement type, and the measurement metadata are provided in a header of the data packet. In still some instances, the policy indicator and the measurement type are provided in a header of the data packet and the measurement metadata is provided before or after a data payload for the data packet.

In some cases, the second network element may send measurement reply message to a network controller and include the policy indicator, at least a portion of the measurement metadata which may also include the context information (e.g., Session Identifier and ingress Node-ID), and measurement information included in the data packet and the collected measurement information.

In some cases, the execution causes the processor to perform further operations, including: receiving a reply message from the second network element, wherein the reply message includes the policy indicator, at least a portion of the measurement metadata, and collected measurement information; and performing one or more actions based on the measurement type, the measurement information included in the data packet, and the collected measurement information.

In yet another embodiment, an apparatus is provided that may include: a plurality of network ports for sending and receiving packets; a memory for storing data; and a processor for executing instructions associated with the data, wherein executing the instructions causes the apparatus to perform operations, including: receiving a data packet at a first network element; determining whether measurement information is to be collected for the data packet; providing one or more measurement fields for the data packet based on a determination that measurement information is to be collected for the data packet, wherein at least one measurement field identifies a measurement type; and forwarding the data packet to a second network element. In some cases at least one other measurement field includes a policy indicator and at least one other measurement field includes measurement metadata. In some cases executing the instructions causes the apparatus to perform further operations, including: receiving a reply message from the second network element, wherein the reply message includes the policy indicator, measurement information included in the data packet, and collected measurement information; and performing one or more actions based on the measurement type, the measurement information included in the data packet, and the collected measurement information.

EXAMPLE EMBODIMENTS

Architectures that facilitate network communications generally rely upon three basic components: a data-plane, a control-plane, and a management-plane. Typically, the data-plane carries data traffic, while the control-plane and the management-plane serve the data-plane. As referred to herein and in the claims, the term 'plane' can refer to a separation of traffic that can traverse a network. Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or other generic data units that may be used to transmit communications (e.g., data and/or commands) in a network. A packet is a formatted unit of data that can contain control or routing information (e.g., source and destination address, etc.) and data, which is also sometimes referred to as a payload or data payload. In some embodiments, control or routing information, management information, or the like can be included in packet fields, such as within header(s) and/or trailer(s) of packets. Communications in a network environment can be sent and received according to any suitable communication protocols. Suitable communication protocols can include a multi-layered scheme such as the Open Systems Interconnection (OSI) Model, or any derivations or variants thereof. As referred to herein and in the claims, the terms 'packet' and 'data packet' may be used interchangeably. Within a network architecture or environment, Internet Protocol (IP) addresses for any element in the network environment can be assigned using Dynamic Host Configuration Protocol (DHCP), Stateless Address Auto-configuration (SLAAC), during default bearer activation processes, etc., or any suitable variation thereof. IP addresses discussed herein and in the claims can include IP version 4 (IPv4) and/or IPv6 IP addresses.

SR policies as defined in Internet Engineering Task Force (IETF) Segment Routing Policy for Traffic Engineering publication, available at "tools.ietf.org/html/draft-filsfils-spring-segment-routing-policy", are used to steer traffic through a specific, user-defined path using segment lists, which consist of Segment Identifiers (SIDs), for traffic engineering (TE) purposes. Segment lists can be carried in a label stack of Multiprotocol Label Switching (MPLS) labels for SR-MPLS data packets or in IPv6 addresses for SR over IPv6 (SRv6) data packets. Traffic flows through these paths are expected to satisfy certain constraints (e.g., end-to-end delay constraints, packet loss constraints, etc.) as may be defined in customer Service Level Agreements (SLAs). For example, services such as tele-medicine, online gaming, stock market trading, autonomous connected cars, and many mission critical applications have strict end-to-end delay bounds. Furthermore, SR technologies can be used with network slicing to provide end-to-end low latency services in 3rd Generation Partnership Project (3GPP) 5th Generation (5G) networks.

Different types of performance measurements may be provided for a network environment. For example, in-situ passive performance measurements may provide for the ability for Performance Measurement (PM) information to be carried by data traffic itself, as opposed to sending probe messages (separate from data messages) to carry PM information through a network. Further, performance measurements can be active or passive. Active performance measurements typically use test traffic for delay and/or loss measurements. Such test traffic can be sent via the control-plane. One-Way Active Measurement Protocol (OWAMP) and Two-Way Active Measurement Protocol (TWAMP) are two protocols that define various active measurement methods. Passive performance measurements use the actual data traffic for delay and/or loss measurements.

In-situ PM use-cases include 1) Performance delay measurement, 2) Performance loss measurement, 3) Proof-of-transit (e.g., to detect mis-forwarding to non-intended path), and so forth. Performance delay measurement relies on (transmit and receive) timestamps, performance loss measurement relies on (transmit and receive) traffic counters and proof-of-transit relies on node address or interface address information. In-situ PM can used be for 1) end-to-end measurement, 2) hop-by-hop measurement, and/or 3) hop-by-hop recording with end-to-end measurement. For end-to-end delay measurement, the forwarding behavior requires, at least in part, the ingress node to add metadata and the egress node to copy (the header in the buffer), (RX) timestamp (in the buffer header), punt, remove metadata, and forward the data packet. For Hop-by-hop delay measurement, the forwarding behavior requires, at least in part, transit node(s) to copy (the packet header in the buffer), (RX) timestamp (in the buffer header), punt and forward the packet. For hop-by-hop recording with end-to-end delay (E2E) measurement, the forwarding behavior requires, at least in part, transit node(s) to insert (RX) timestamp and forward the packet. Other Operations, Administration, and Maintenance (OAM) use-cases are also applicable. Performance loss measurement and some other use-cases may use sequence numbers.

A Delay Measurement (DM) may be calculated on a hop-by-hop basis and/or on an end-to-end basis. One method for calculating hop-by-hop or end-to-end delays may include calculating a difference between transmit and receive times associated with a packet or packet flow. Different methods or modes of packet Loss Measurement may also be used in a network. Internet Engineering Task Force (IETF) publication Request For Comments (RFC) 6374 sets forth different modes of Loss Measurement (LM). The LM protocol can perform two distinct kinds of loss measurement: Inferred Mode and Direct Mode. The Inferred Mode involves measuring the loss of specially generated test messages in order to infer the approximate data plane loss level. This Inferred Mode loss measurement provides only approximate loss accounting. The Direct Mode directly measures data plane packet loss. This Direct Mode loss measurement provides perfect loss accounting, but may involve hardware support for implementation.

When end-to-end delay, packet loss, mis-forwarding to a non-intended path, etc. experienced by traffic violates constraints of one or more SLAs, such violations are expected to be detected and corrected using another path within a sub-second interval. Therefore, to ensure satisfaction of customer SLAs, it is desirable to monitor delay, packet losses, etc. that may be experienced by traffic within a network. One typical customer requirement is to trigger a protection switchover (e.g., switching traffic for one or more packet flows from one network path to another network path) when performance metrics exceed some pre-configured threshold. For some SR networks, there is are requirements for delay (end-to-end and/or hop-by-hop) and Direct Mode loss passive performance measurement of data traffic carried by SR Policies. Such passive performance measurement is to be performed without using control-plane probe query messages or sending test traffic from the control-plane.

In some cases, operators may observe high latency for an end user application/service flowing over an SR Policy in a network. In such cases, it is not possible to easily trace the exact path taken by the traffic flow of the end-user application/service due to Equal-Cost Multi-Path (ECMP) routing paths on ingress and transit nodes. A hashing function in the forwarding plane of such nodes determines the ECMP path, which can vary based on the hashing. Hence, probe query messages crafted in control-plane with end-to-end ECMP forwarding path of the SR Policy cannot be used, as the probe messages cannot be easily mapped to the path taken by the traffic flow of the application/service over the SR Policy and the probe messages cannot be sent with IP source and destination addresses of the customer traffic.

In some cases, in 5G networks, there is a requirement to measure end-to-end delay for customer traffic flow that includes all internal delay within the ingress, transit and egress nodes. The customer traffic flows from many different ingress Linecards on the ingress node may be steered to an SR Policy. Similarly, traffic flows may go out of many different egress Linecards on the egress node. Hence, it is not scalable to measure delay of all (combinations of) end-to-end paths from all ingress Linecards on ingress nodes to all egress Linecards on the egress node. Access-list can be configured for a specific customer traffic flow on the ingress Linecard on the ingress node and measure end-to-end delay for it from the ingress Linecard on ingress node to egress Linecard on egress node, using the in-situ end-to-end delay measurement method.

Some network operators may desire a SR Policy segment list to be configured with a node Segment Identifier (SID) that may be a next-hop node or may be multi-hops away. This may be useful for various reasons, such as: 1) to take advantage of potential ECMP paths between an ingress node and one or more other nodes; and/or 2) platforms may have limits on the size of the label stack that can be imposed for packets and, thus, may not carry label stacks for the entire end-to-end ECMP forwarding path. Forwarding behavior on the nodes along a path may be specific to the node SID (e.g., different queuing, etc.). Thus, it may be desirable to provide performance measurements on the actual data traffic instead of using probe messages crafted in control-plane that may take different ECMP paths and/or may not carry the exact same label stack as data traffic, which may result in different queueing behavior on the intermediate routers, which can lead to PM data obtained by control-plane probe messages being different than the performance of the data traffic.

Network Service Function Chaining (SFC) enables automated provisioning of the network applications that may have different characteristics (data, video, etc.). It can ensure that the specific applications are getting the proper network resources or desired behaviors (bandwidth, encryption, quality-of-service (QoS), etc.). SDN analytics/tools can be used along with SFCs to enable efficient use of network resources and improving application performance, for example, work around network congestion issues. The 'chain' in service function chaining represents the service functions that can be connected across the network using software provisioning. Examples of service functions include firewall, resource allocation, Network Address Translation (NAT), Load Balancer, Deep Packet Inspection (DPI), queuing, security/encryption, etc.

In SFC, a Service Classifier determines which traffic (data packets) requires service and forms the logical start of a service path. A service path (SP) is the actual forwarding path used to realize a service chain. Think of service chain as the 'intent' and service path as the actual instantiation of the chain in the network. A Service Function Forwarder (SFF) is responsible for delivering traffic received from the network to one or more connected service functions (SF) according to information carried in the network service header of the packets as well as handling traffic coming back from the SF.

Principles of example embodiments described herein provide an in-situ passive mode of Performance Measurement (PM) as Service Function Chaining (SFC) for actual data traffic within a network. In-situ passive performance measurement may also be referred to herein and in the claims as In-Situ Passive Measurement (IPM). Referring now to FIG. 1, a network 100 in which techniques for in-situ passive performance measurement may be implemented is illustrated according to an example embodiment. Embodiments described herein may facilitate in-situ passive performance measurement for delay and/or loss measurements within a network, in which Direct Mode LM may be provided. Consider for the embodiment of FIG. 1 that network 100 is an SR-MPLS network, which may, in at least one embodiment, be implemented as an SR-MPLS SDN. In another embodiment, the network 100 may be an SRv6 network, which may, in at least one embodiment, be implemented as an SRv6 SDN In at least one embodiment, network 100, as shown in FIG. 1, may include a plurality of network elements or nodes including a first customer edge node 101, a first network element 102, a first intermediate network element 103, a second intermediate network element 104, a second network element 105, and a second customer edge node 106. In this embodiment, customer edge nodes 101, 106 may be network elements (e.g., routers) that are located on a customer's premises that provide an interface to/from a provider's core network. For example, in this embodiment, the provider's core network may be represented by first network element 102, first intermediate network element 103, second intermediate network element 104, and second network element 105 of network 100. Additionally, network 100 may further include a network controller 110 that provides monitoring, control, and/or management operations for one or more components of network 100, including first network element 102, first intermediate network element 103, second intermediate network element 104, and second network element 105.

In various embodiments, network elements or nodes of network 100 may be endpoints of any of a variety of types, such as routers, servers, switches, data storage devices, gateways, as well as networking appliances, such as firewalls, intrusion detection systems, etc. The endpoints may be physical, virtual (e.g., implemented in software), or any combination thereof. In an example embodiment, first network element 102 and second network element 105 may be routers that are configured to route packets through network 100, including routing packets between first customer edge node 101 and second customer edge node 106. Network elements, network nodes, and/or systems discussed for various embodiments described herein can couple to one another through simple interfaces (as illustrated) and/or through any other suitable connection (wired or wireless), which provides a viable pathway for network communications. Additionally, any one or more of the network elements, network nodes, and/or systems may be combined or removed from a given deployment based on a particular configuration and/or implementation. Although only three provider network elements and two customer edge nodes are illustrated in the embodiment of FIG. 1, it is to be understood that any number of elements and/or nodes may be provided in a network environment in accordance with embodiments described herein.

Techniques for in-situ passive performance measurement described herein may use the following terms and terminology throughout this description and claims:

SR Policy label: an SR Policy label identifies an SR Policy on which a packet flow or traffic is received. An SR Policy label may be referred to herein as a policy indicator. An egress node, which is the network element at which the SR policy is terminated, allocates the SR Policy label or labels that is locally unique. Alternatively, a network controller (e.g., 110) allocates an SR Policy label that is globally unique in the network and communicates the SR Policy Label to the ingress and egress nodes of the SR Policy. Globally unique SR Policy label is useful for In-Situ performance measurement on intermediate nodes. An SR policy may be considered an SR-MPLS policy for SR-MPLS data-plane implementations or may be considered an SRv6 policy for SRv6 data-plane implementations. For LM, two SR Policy labels are allocated but one of them is active to carry data traffic. Features associated with the SR Policy labels allocated for LM are discussed in further detail below with regard to color. The SR Policy label (or labels) may be communicated to an ingress node, which is the network element at which an SR policy is instantiated. The ingress node stores the SR Policy label in association with an Access Control List (ACL) in order to match a packet flow or traffic with an SR Policy label (or labels). In various embodiments, the SR Policy label (or labels) may be communicated to the ingress node using a variety of different mechanisms including, but not limited to: via a controller (e.g., network controller 110) or Path Computation Element (PCE) using Traffic Engineering via a Border Gateway Protocol (BGP-TE) signaling, and/or via configuration (e.g., manual or automatic). In at least one embodiment, the egress node programs or otherwise configures the local forwarding plane (e.g., for the ingress node and one or more intermediate nodes) for the SR Policy label or labels. As discussed in further detail herein, the ingress node sends data traffic for a packet flow over an SR Policy with the SR Policy label. The incoming SR Policy label ensures that the egress node receives the in-situ PM metadata in the header of the packet (i.e., does not get removed on the previous nodes) and it can identify the traffic for the associated SR Policy on the node for the in-situ measurement purpose.

Color: The term 'color' may serve as an indicator that can be used to identify or mark packets of a packet flow or traffic. For loss PM operation, the ingress node changes the SR Policy label to identify a color of a packet flow or data traffic at every measurement interval. As noted above, two SR Policy labels are allocated for loss measurements. Thus, the color assigned to data packets may be periodically toggled between two different colors or indicators at every measurement interval. In other words, one SR Policy label is active in forwarding to carry traffic at a time.

PM Label Indicator: A PM Label Indicator (PLI) may be a special/reserved identifier that can be used to uniquely identify a performance measurement type. A PLI may be included in a header field of a data packet. During operation in some embodiments, performance measurement processes configured for the ingress node of an SR Policy may provide the PLI for a field of data packets of a packet flow or traffic for which PM is to be provided. As a packet traverses an SR Policy, performance measurement processes configured for one or more network nodes and/or elements that may receive a data packet for an SR Policy check the PLI to determine whether one or more PM related actions should be performed based on the performance measurement type indicated by the PLI. For example, a PLI may be for a hop-by-hop measurement (e.g., {PLI(2)}, as discussed herein), end-to-end measurement (e.g., {PLI(1)}, as discussed herein), or hop-by-hop recording with end-to-end measurement (e.g., {PLI(3)}, as discussed herein). A PLI may be any value, number, alphanumeric sequence, bit string/sequence, flag, combinations thereof, or the like in accordance with embodiments described herein and in the claims. Different PLIs may be configured, in some embodiments, by a network operator, customer, network controller (e.g., network controller 110), or any combination thereof for an implementation and/or application. In another embodiment, the PLI can be allocated globally from the domain wide SR Global Block (SRGB) by a network controller (e.g., 110). It can be a global label or an index in the SRGB. A controller programs the global label as PLI on each node. In this case, a special/reserved label is not required as PLI.

PM metadata: In some embodiments, data packets for in-situ passive performance measurement may be configured to carry PM metadata in one or more fields of the data packets. PM metadata can include any information that may be used with in-situ passive performance measurement operations. In various embodiments, PM metadata may include, but not be limited to: a Session Identifier, a transmit (TX) timestamp, a sequence number, a TX traffic-counter value, Node-ID, combinations thereof, or the like that may be used to facilitate in-situ PM for a network. In at least one embodiment, the TX traffic-counter value carried by data packets or traffic for LM is for the in-active SR Policy Label (e.g., the SR Policy label that is not currently active to carry traffic) for a particular measurement interval. In at least one embodiment, Node-ID information and/or node address information may be used to identify the ingress node for an SR Policy, which may be used by an egress node (e.g., for end-to-end or hop-by-hop recording with end-to-end PM) and/or one or more intermediate nodes (e.g., for hop-by-hop PM) to communicate performance measurement information (e.g., PM metadata carried in a packet and/or PM information recorded/maintained at a node) for the SR Policy. In at least one embodiment, a Session Identifier included in PM metadata may be any unique value that may be used to identify an SR Policy on an ingress node for an SR Policy. In some embodiments, PM metadata can be carried in a Type-Length-Value (TLV) object, field, or element, such as a PM Metadata TLV as discussed in further detail herein. As referred to herein, the terms 'TLV element' and 'TLV' can be used interchangeably. Generally, a TLV includes a Type field, a Length field and a Value field.

In at least one embodiment, a format for a PM metadata TLV can be as follows:
PM Metadata TLV :=Type Length Value
Type :=PM metadata type
Length :=VAR-NUMBER
Value :=metadata In at least one embodiment, the Type field is used to indicate what type of PM metadata (PM metadata type) is carried in metadata within the Value field and the type of data that is to be collected for various measurement types, including, but not limited to: performance delay measurement (DM), performance loss measurement (LM), performance loss and performance delay measurement (DM+LM), and/or node address (e.g., for PoT) data collection. Thus, there can be different types of PM Metadata TLVs including, but not limited, to PM metadata as a DM Type (e.g., a DM TLV), an LM Type (e.g., a LM TLV), a DM+LM Type (e.g., a DM+LM TLV), and/or a node address type (e.g., a node address TLV). Different measurement information can be carried in metadata within the Value field based on Type may include timestamps, traffic-counter values, sequence numbers, and/or Node-IDs. Context information can also be carried in a PM Metadata TLV (of any Type) including, but not limited to, a Session Identifier and an ingress Node-ID. In some embodiments, the Length field can contain the length of the Value field. In other embodiments, the Length field may contain the length of the PM Metadata TLV. An indicator for type of PM metadata carried in the Type field may be any value, number, alphanumeric sequence, bit string/sequence, flag, combinations thereof, or the like in accordance with embodiments described herein and in the claims that can be used to identify the PM metadata type. In some embodiments, the Metadata Type may indicate if the value present in TLV is timestamp, or traffic-counter, sequence number or Node-ID, and so forth.

Timestamp: Timestamps may be used to identify time information associated with a packet. For example, a TX timestamp may identify transmit time information associated with the time at which a network node or element transmits a packet. In another example, a receive (RX) timestamp may identify receive time information associated with the time at which a network node or the time at which a network node or element receives a packet. In some embodiments, timestamps may be associated with synchronized Precision Time Protocol (PTP), as defined by Institute of Electrical and Electronics Engineers (IEEE) 1588v1 standard, or Network Time Protocol (NTP) clocks configured for one or more network nodes or elements along an SR Policy path, which may facilitate accurate one-way DM. Features associated with PTP clock synchronization are discussed in further detail herein.

Sequence Number: A sequence number is a type of telemetry information that may be associated with a packet flow or traffic. For a sequence of packets, the sequence numbers for these packets increases of the sequence of packets in the flow. Generally speaking, the sequence number is incremented by one for each packet. The presence of sequence numbers makes it possible to determine many performance characteristics. For instance, the sequence number can be used to determine whether a packet has been lost or how many packets were lost for LM. In another instance, the sequence number can be used to determine whether the packets arrived out of order. In still some instances, sequence numbers can be used for assessing jitter in a network.

Traffic-Counter value: A traffic-counter value is another type of telemetry statistics information that may be associated with a packet flow or traffic. Generally speaking, the traffic-counter value for a packet flow or traffic can be incremented based on a number of packets and/or bytes for the packet flow or traffic that have been transmitted and/or received by a network element or node for one or more measurement interval(s). During each measurement interval for LM, measurement information (e.g., traffic-counter value(s)) may be collected from counters configured for one or more network elements or nodes (e.g., the ingress node, the egress node, and/or one or more intermediate nodes) that detect a number of packets sent with the PM Policy label (for a given color) assigned during the previous measurement interval for correlation (e.g., a loss performance measurement determination) between the number of packets transmitted by one node and the number of packets received by another node during the measurement interval.

Access Control List: Access Control Lists (ACLs) are configured (e.g., by a network operator, via a PCE, and/or via network controller 110) for the ingress node (e.g., first network element 102) for one or more SR Policies in order to match data packet flows that may be used for performance delay and/or loss measurements. For example, operators may configure an ACL with the IP source address and IP destination address, source port, destination port, or any other identifying information that may facilitate matching the traffic flow of a service, application, etc. Thus, PM of the actual traffic flow of the service matching the ACL can be enabled without knowledge of the exact path of the traffic flow of the service within a network. The ACL may affect the forwarding performance for an IP flow, but it is only for a specific IP flow associated with a PM, and it may be used for a short period of time. Multiple ACLs can be configured for the ingress node.

Node Address, Node-ID, Node-SID, or Prefix-SID: In some embodiments, a node address or Node Identifier (Node-ID), which can be referred to herein interchangeably, may be used to identify the IPv4 or IPv6 address of a node. In some embodiments, a Node-ID can be used to check if a particular data traffic flow is traversing via intended nodes in the network for Proof-of-Transit (PoT) requirements. In some embodiments, a Node-ID can also be segment identifier of a node (e.g., Node-SID or Prefix-SID). In some use-cases, interface address or adjacency SID on a node may be used instead of or in addition to the node address and node segment identifier.

Session Identifier: A Session Identifier or Session ID, which can be referred to interchangeably, is used by the ingress node or a network controller (e.g., 110) to associate the in-situ performance measurement information with the SR Policy on the node. The ingress node may send Session ID in a context in the PM metadata TLV of the packet. In the absence of Session ID, the egress node may send an SR Policy label in a reply message as the Session ID for the reply message since SR Policy label is unique on the egress node. The ingress node can store measurement information in a database using the Session ID.

Referring back to FIG. 1, first network element 102 is considered the ingress node and second network element 105 is considered the egress node for an SR Policy of network 100. The techniques for in-situ passive performance measurement according to various embodiments described herein may be described generally in reference to FIG. 1 and are applicable to any routing protocols running on a network device.

Different fields of data packets may be augmented with any combination of PM related information including, but not limited to a policy indicator such as an SR Policy label, an SID Function (discussed in further detail herein), a PLI, and/or PM metadata, which may be used to trigger PM related actions at one or more network elements or nodes. In various embodiments, one or more measurement fields of a data packet that may be augmented with such PM related information may include, but not be limited to an MPLS label carried in an MPLS header (e.g., a label stack), a TLV element carried in a header, multiple TLVs carried in a header, one or more TLV(s) appended to the data payload of a data packet, a Segment Routing Header (SRH) for an SRv6 implementation, an IPv6 header for an SRv6 implementation, an Ethernet Virtual Private Network (EVPN) label for an EVPN implementation, a Resource Reservation Protocol (RSVP) signaled Traffic Engineering (TE) Label Switched Paths (LSPs) implementation, a Label Distribution Protocol (LDP) implementation, among others. In some embodiments, the solutions discussed herein may be extended beyond use of an SR Policy label. For example, solutions discussed herein may work for any label imposition case in an SR network.

Example embodiments include but are not limited to: when end-to-end DM is required for an SR Policy, the ingress node adds PLI(1) and PM Metadata TLV with Type set to timestamp or DM. When hop-by-hop DM is required for an SR Policy, the ingress node adds PLI(2) and PM Metadata TLV with Type set to timestamp or DM. When hop-by-hop recording with E2E DM is required for an SR Policy, the ingress node adds PLI(3) and PM Metadata TLV with Type set to timestamp or DM. When end-to-end LM is required for an SR Policy, the ingress node adds PLI(1) and PM Metadata TLV with Type set to counter or sequence number or LM. When hop-by-hop LM is required for an SR Policy, the ingress node adds PLI(2) and PM Metadata TLV with Type set to counter or sequence number or LM. When hop-by-hop recording with E2E LM is required for an SR Policy, the ingress node adds PLI(3) and PM Metadata TLV with Type set to counter or sequence number or LM. When end-to-end PoT is required for an SR Policy, the ingress node adds PLI(1) and PM Metadata TLV with Type set to Node-ID or PoT. When hop-by-hop PoT is required for an SR Policy, the ingress node adds PLI(2) and PM Metadata TLV with Type set to Node-ID or PoT. When hop-by-hop recording with E2E PoT is required for an SR Policy, the ingress node adds PLI(3) and PM Metadata TLV with Type set to Node-ID or PoT.

Consider an example for FIG. 1 in which an end-to-end in-situ passive delay measurement is to be performed for a packet flow or traffic 112 that originates from customer edge node 101. Packet flow 112 comprises a plurality of packets, including a first data packet 114. Further for the present example, consider that an ACL for an SR Policy that identifies packet flow 112 is configured on first network element 102, that an SR Policy label of {16105} associated with the SR Policy for a PM associated with flow 112 is stored on first network element 102, that a PLI of a type {PLI(1)} is configured on first network element 102, which indicates an end-to-end measurement type, the PM metadata type indicates DM, and that a segment list for an MPLS label stack of the SR Policy includes labels {24134, 24145} identifying the path through the second intermediate network element 104. In this example, label {24134} is the first adjacency label between first intermediate network element 103 and second intermediate network element 104, whereas label 24145 is the first adjacency label between second intermediate network element 104 and second network element 105.

The {PLI(1)} measurement type and any others discussed for various examples herein are provided for example only and are not meant to limit the broad scope of the present disclosure. As discussed previously, a PLI and associations to a particular measurement type can be configured by a network operator or the like using a variety of information, associations, etc. in accordance with embodiments herein.

In this example, first data packet 114 is received by first network element 102. First network element 102 determines whether measurement information is to be collected for packet flow 112 by comparing packet information (e.g., 5-tuple from the IP header, etc.) for data packet 114 to ACLs configured for first network element to determine whether the packet information matches the configured ACL for the SR Policy. Based on a determination that the packet information does match the ACL configured for the SR Policy {16105}, first network element 102 adds an MPLS label stack 120 to first data packet 114. MPLS label stack 120 is discussed in further detail, below.

In some embodiments, the determination of whether measurement information is to be collected for a packet can be based not only on ACLs, but also an indication of an active measurement interval for performing in-site passive performance measurement as may be used for LM, for example. In various embodiments, a measurement interval may be a periodic based on a predetermined amount of time. For example, in at least one embodiment, measurement intervals may be approximately every 2 minutes. Other measurement intervals, which may be periodic or non-periodic, may be configured for various applications and/or implementations.

For the present example, consider that first network element determines that measurement information is to be collected for data packet 114 based on the ACL comparison. As noted, first network element 102 is considered the ingress node of the SR Policy (e.g., the SR-MPLS Policy, in this example). Accordingly, the SR-MPLS Policy is instantiated by first network element 102. MPLS label stack 120 may be considered a header for first data packet 114.

For cases in which it is determined that no measurement information is to be collected for a data packet, in one embodiment, the ingress node can provide an MPLS label stack including appropriate information (e.g., labels) for the data packet that enables to packet to be routed according to an SR-MPLS Policy to the egress node for the SR-MPLS Policy.

Referring again to the embodiment of FIG. 1, an outermost or top label 121 of MPLS label stack 120 includes the {24134} label is the first adjacency label between first intermediate network element 103 and second intermediate network element 104. A next label 122 includes the {24145} label that is the first adjacency label between second intermediate network element 104 and second network element 105. An SR Policy label 123 (e.g., a policy indicator) of MPLS label stack 120 identifies the SR Policy {16105}. As referred to herein, an SR Policy label 122 (e.g., SR Policy label 123) that identifies an SR Policy (e.g., {16105}) can be referred to collectively using the term 'SR Policy label { }'.

For the present example, the ingress node (first network element 102) of the SR Policy, for a given measurement interval adds, adds a PLI 124 indicating a performance measurement type {PLI(1)} (e.g., that is associated with end-to-end PM for the present example), and PM metadata 125 having the PM metadata type set to indicate delay measurement to MPLS label stack 120 of first data packet 114 for a performance delay measurement of the packet flow 112. In at least one embodiment, PM metadata 125 may be a TLV element added to MPLS label stack 120 of data packet 114. Note, PM metadata 125 could include metadata associated with performance loss measurement if such measurements were to be determined. For the present example, PM metadata 125 includes a Session Identifier, an Ingress Node-ID (e.g., Node-ID for first network element 102), a TX timestamp, and a sequence number. For embodiments involving LM, a TX traffic-counter value may also be included in PM metadata type for a data packet for loss measurement. In such embodiments, the TX traffic-counter value carried by the data traffic packet is for the in-active SR Policy label. For embodiments involving proof-of-transit (PoT), Node-ID or Interface ID may also be included in PM metadata for a data packet.

Accordingly, for the present example, one or more measurement fields provided for data packet 114 include SR Policy label 122 indicating SR Policy {16105}, PLI 124 indicating {PLI(1)} associated with an end-to-end measurement type, and PM metadata 125 carrying metadata such as a Session Identifier, an Ingress Node-ID, a TX timestamp, and a sequence number.

After removing the top label 121 of MPLS stack 120, first network element 102 forwards data packet 114, including MPLS label stack 120, to first intermediate network element 103. The first intermediate network element 103 walks (e.g., checks) the entire MPLS label stack 120 of the data packet to determine the measurement type carried in PLI 124. Based on a determination that {PLI(1)} indicates an end-to-end measurement, first intermediate network element simply forwards the packet (without performing any PM related action for data packet 114) to second intermediate network element 104. In another embodiment, say for a PLI type of {PLI(3)} indicating hop-by-hop recording with end-to-end measurement, the first intermediate network element would find {PLI(3)} upon checking the label stack and determine that it is to update the PM metadata TLV in the data packet to add its RX timestamp and then forward the data packet 114 to second intermediate network element 104.

Returning to the present example, second intermediate network node 104 'pops' MPLS label stack 120 to remove label 122. As discussed above, transit nodes associated with an SR Policy analyze the PLI of packets in order to determine whether one or more PM related actions should be performed. For the example of FIG. 1, second intermediate network element checks PLI 124 indicating {PLI(1)} (e.g., an end-to-end PM) and forwards data packet 114 to second network element 105 based on a determination that no PM related actions are to be performed at the transit node.

The egress node (second network element 105), upon receiving data packet 114, analyzes PLI 124 to determine one or more performance measurement related actions based on the performance measurement type identified by {PLI (1)}. For example, based on a determination that {PLI(1)} indicates an end-to-end PM and based on the PM metadata type for DM, the egress node copies the SR Policy label {16105} and PM metadata 125 in a local buffer header (which is a memory for the packet internally allocated, for example, on a Linecard as a cache to send information from the data-plane to the control-plane), collects measurement information such as an RX timestamp indicating the receive time for data packet 114, copies the RX timestamp in the local buffer header, and further processes the buffer header using the performance measurement process operating in the control-plane of the egress node. Data packet 114 is forwarded downstream to second customer edge node 106 after removing SR Policy label 123, PLI 124, and PM metadata 125.

Based on the performance measurement type identified via {PLI(1)} and the PM metadata type indicating DM for the present example, the performance measurement process for the egress node performs one or more PM related actions including, but not limited to, identifying the SR Policy {16105} based on SR Policy label 122 and computing an end-to-end delay for the SR Policy using the collected RX timestamp and the TX timestamp included in PM metadata 125.

In at least one embodiment, the egress node (e.g., second network element 105) may notify an ingress node (e.g., first network element 102) with information (e.g., measurement information and/or calculations) about an end-to-end delay and/or loss of an SR Policy. For example, in at least one embodiment, the egress node may send an Internet Protocol/User Datagram Protocol (IP/UDP) probe reply message 116 as defined in RFC 7876 to the ingress node with timestamps for DM and/or traffic-counter values for LM according to the RFC 6374 packet format (as described above) as a payload. For example, if LM were to be computed, other measurement information such as TX traffic-counter values and RX traffic-counter values could be collected and stored for further processing and/or end-to-end loss could be determined (e.g., by calculating a difference between TX and RX traffic-counter values). In some embodiments, the egress node may send measurement information to the ingress node, which may perform one or more measurement related actions (e.g., calculations, protection switchover to another path, etc.) based on the received information. In some embodiments, the collected measurement information may also be sent to a network controller (e.g. 110).

As referred to herein in this disclosure, the terms 'probe reply message', 'reply message', 'response packet', and variations thereof can be used interchangeably. In some embodiments, an egress node may notify a controller (e.g., network controller 110) with information for an SR Policy. Such notifications may include the policy indicator, at least a portion of the measurement metadata which may also include context information (e.g. session ID and ingress Node-ID), and measurement information included in the data packet and the collected measurement information.

Figure 2:
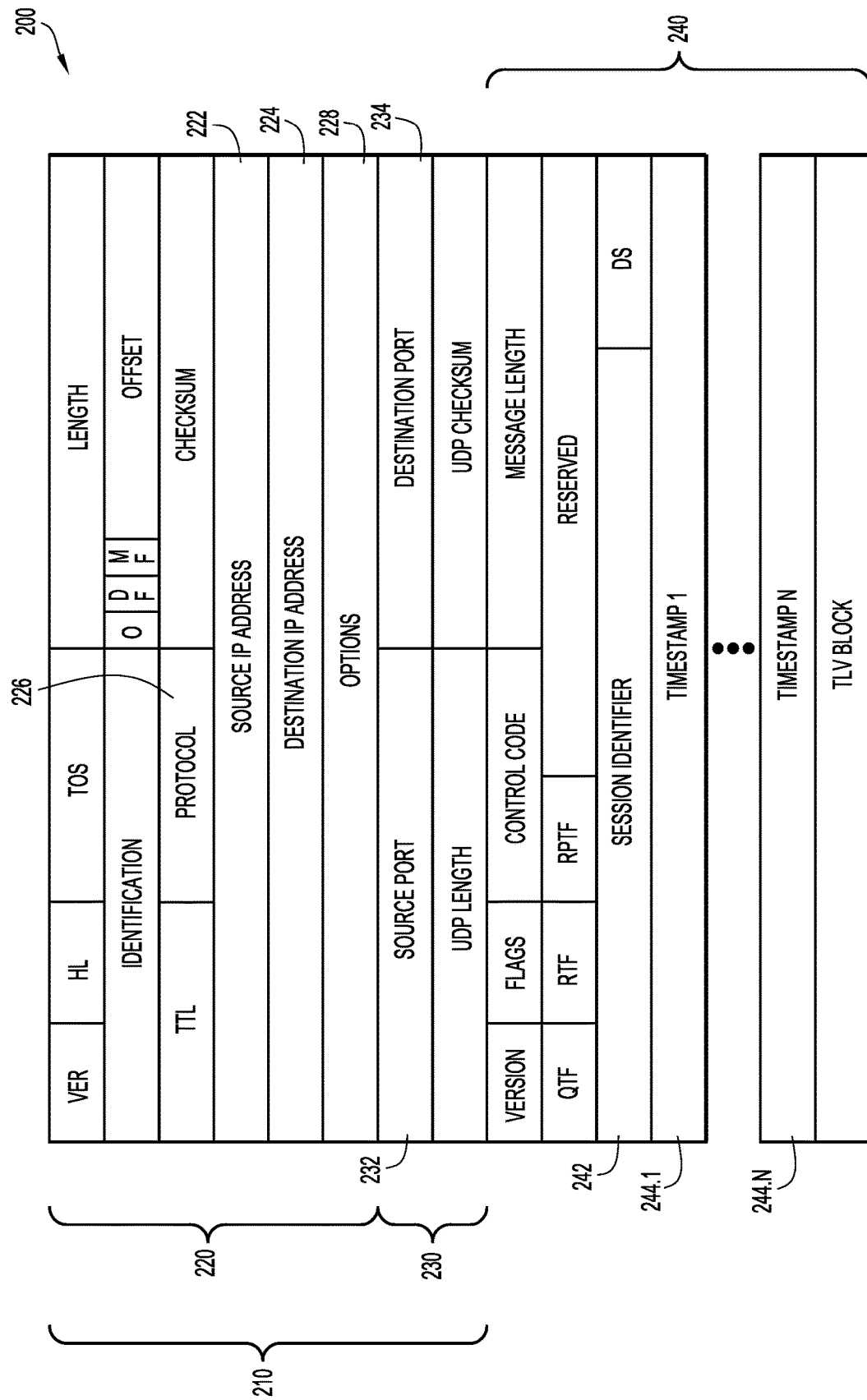
FIG. 2 illustrates an example of an Internet Protocol (IP)/User Datagram Protocol (UDP) probe reply message, according to an example embodiment.

Referring to FIG. 2, FIG. 2 illustrates an example of an IP/UDP probe reply message 200, according to an example embodiment. IP/UDP probe reply message 200 may be configured to carry measurement information such as DM information (e.g., timestamps, etc.) for reporting to an ingress node for a given SR Policy. As shown in FIG. 2, IP/UDP reply message 200 includes an IP/UDP header 210 and a DM packet 240, which is configured according to the RFC 6374 packet format. IP/UDP header 210 may include an IP Header 220 and a UDP Header 230.

In at least on embodiment, IP header 220 may include one or more fields including: a source IP address field 222, which may include the IPv4 or IPv6 (Node-ID) node address of the responder (e.g., the egress node (second network element 105)), so that the ingress node (e.g., first network element 102) can identify the SR Policy tail-end node; a destination IP address field 224, which may include the source IP address from the query (e.g., first network element 102); a protocol indicator field 226 set to UDP; and a route alert option field 228, which may not be set. UDP header 230 may include one or more fields including: a source port field 232, as chosen by the responder (e.g., the egress node); and a destination port field 234, which may be the source port from the query (e.g., the ingress node).

DM packet 240 has the following fields, including, but not limited to: a Session Identifier field 242, and an 'N' number of Timestamp fields 244.1-244.N. The egress node (e.g., second network element 105) can use the SR Policy label as the Session Identifier to identify the SR Policy associated with PM (e.g., DM) measurement information. Thus, the Session Identifier for the Session Identifier field 242 can be set to the SR Policy label as was received in a data packet or, alternatively to the received Session Identifier value in the metadata. Any 'N' number of timestamps may be included in Timestamp fields 244.1-244.N of IP/UDP probe reply message 200 in any timestamp format (TF) (e.g., PTP or NTP).

Figure 3:
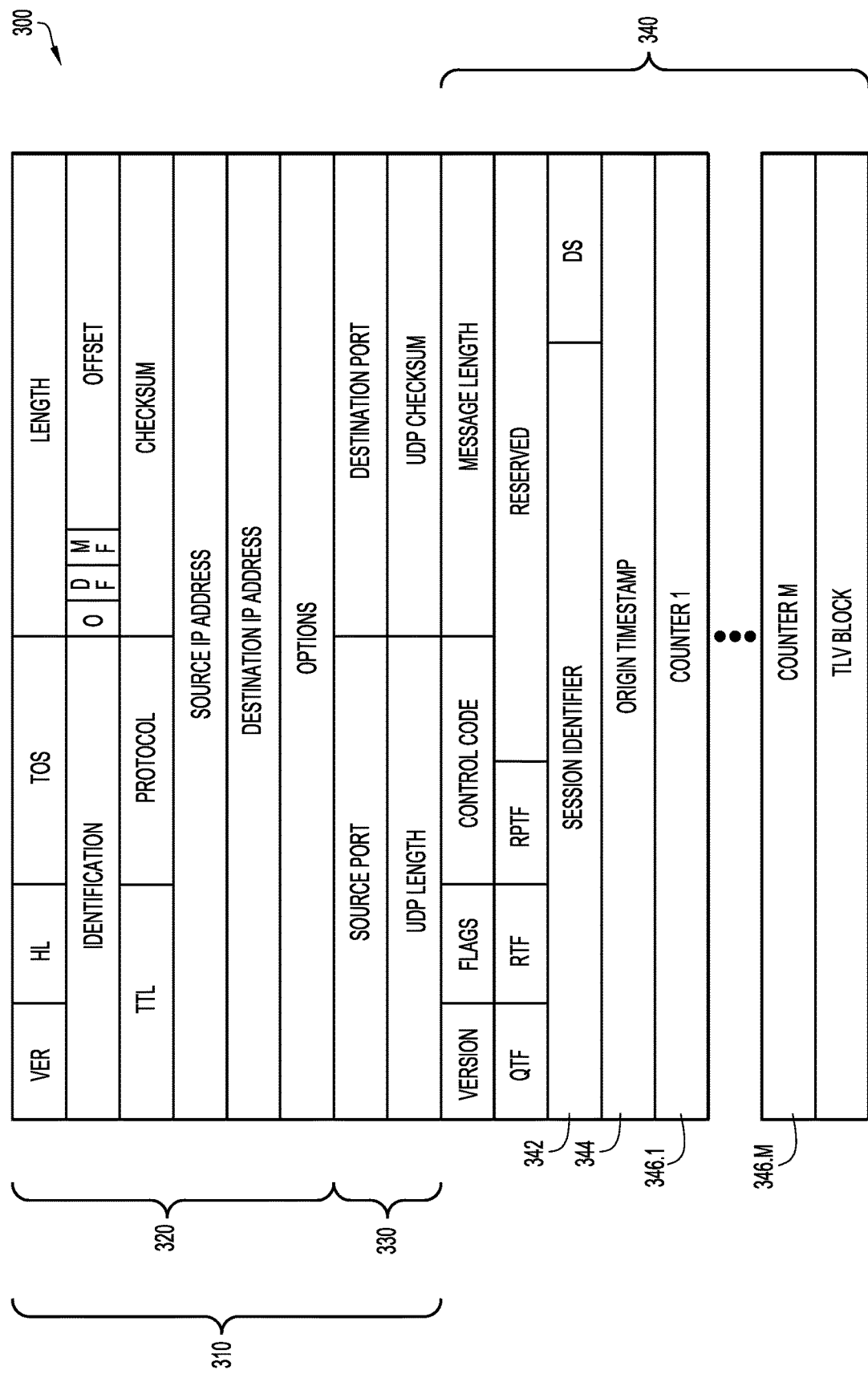
FIG. 3 illustrates another example of an IP/UDP probe reply message, according to an example embodiment.

Referring to FIG. 3, FIG. 3 illustrates another example of an IP/UDP probe reply message 300, according to an example embodiment. IP/UDP probe reply message 300 may be configured to carry measurement information such as LM information (e.g., traffic-counter values, etc.) for reporting to an ingress node for a given SR Policy. As shown in FIG. 3, IP/UDP reply message 300 includes an IP/UDP header 310 and a LM packet 340, which is configured according to the RFC 6374 packet format. IP/UDP header 310 may include an IP Header 320 and a UDP Header 330, configured as discussed above.

LM packet 340 has the following fields, including, but not limited to: a Session Identifier field 342, an Origin Timestamp field 344, and an 'M' number of Counter fields 346.1-346.M. Origin Timestamp field 344 includes a timestamp for the packet in a known format, for example, NTP or PTP. The egress node (e.g., second network element 105) can use the SR Policy label as the Session Identifier to identify the SR Policy associated with PM (e.g., LM) measurement information. Thus, the Session Identifier for the Session Identifier field 342 can be set to the SR Policy label as was received in a data packet or, alternatively, to the received Session Identifier value in the metadata. Any 'M' number of traffic-counter values may be included in Counter fields 346.1-346.M of IP/UDP probe reply message 300.

Other types of packets and/or information may be included in probe reply message. In some embodiments, for example, traversed node addresses for one or more nodes for which a packet traverses for a given path (e.g., transit nodes) may be included in an IP/UDP message. Traversed node address information may be used in PoT use-cases, as discussed herein.

Referring again to the example discussed above with reference to FIG. 1, the egress node (second network element 105) sends IP/UDP probe reply message 116 to the ingress node (first network element 102) with the source IP address field in the IP header (not shown in FIG. 1) set to the node address of second network element 105, the Session Identifier set to the SR Policy label {16105}, or alternatively to the received Session Identifier value in the metadata, and includes the TX timestamp and the RX timestamp (neither shown in FIG. 1) according to the RFC 6374 packet format, as discussed above.

Embodiments of the present disclosure can be configured to limit the number of probe reply messages sent to an ingress node, which may help to decrease traffic in a network (e.g., network 100). For example, in some embodiments, an SR Policy may be configured such that egress node sends a probe reply message to an ingress node only if performance metrics exceed a configured threshold or thresholds (e.g., any combination of delay and/or loss thresholds). PM related actions that may be performed by an ingress node upon receipt of a probe reply message may also be configured for a network. For example, in some embodiments, receipt of a probe reply message by an ingress node can be used to trigger a protection switchover on the ingress node (e.g., to switch packet forwarding to a different path). Other PM related actions can be envisioned. For example, the ingress node may perform calculations using measurement information received from one or more nodes belonging to an SR Policy. Such reply message may also be sent to a network controller (e.g., 110).

Figure 4:
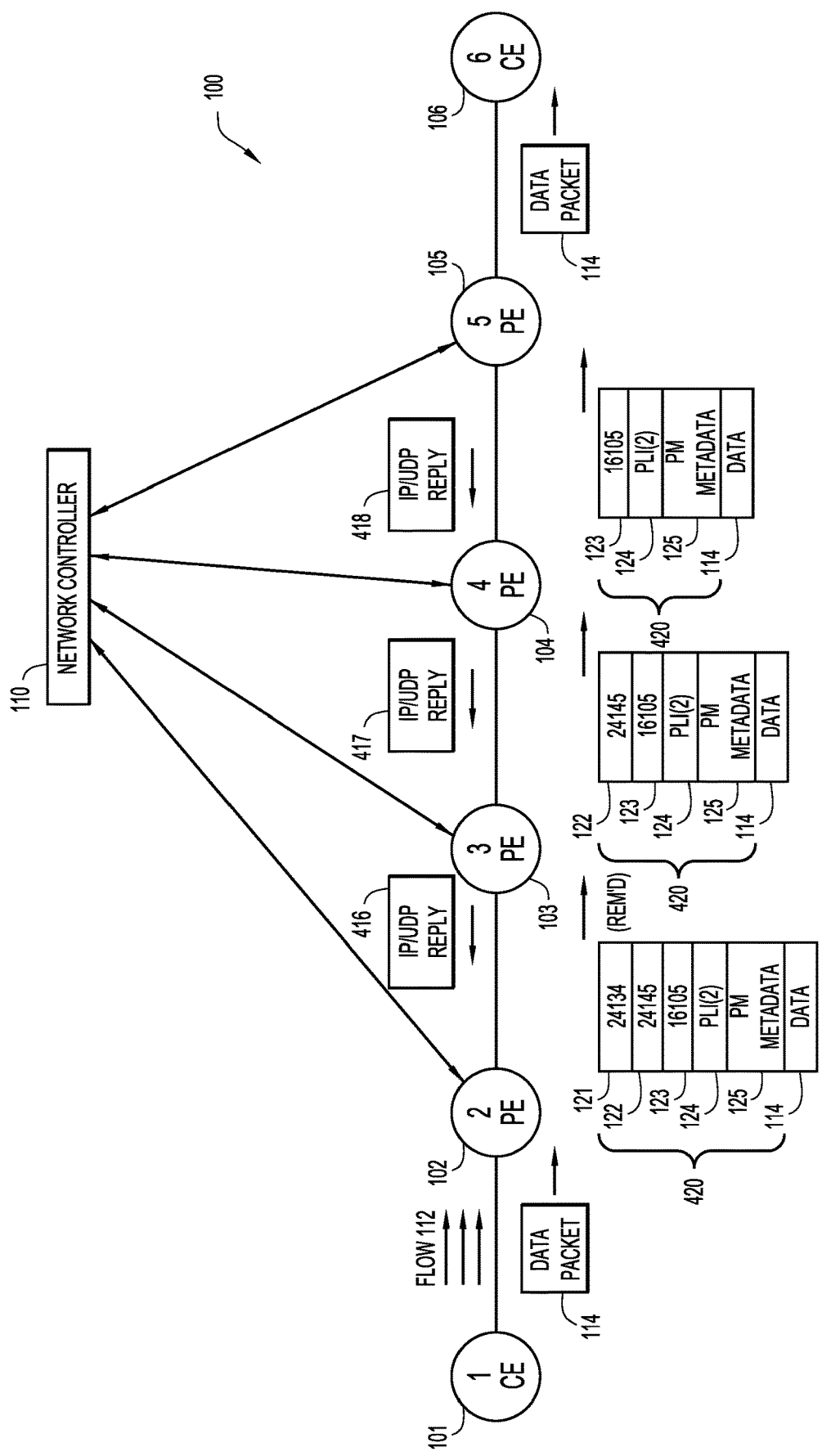
FIG. 4 is a simplified diagram illustrating the network of FIG. 1 in which other techniques for in-situ passive performance measurement may be implemented, according to an example embodiment.

Techniques for in-situ passive PM described herein also allow for performing PM related actions at one or more transit node(s) for hop-by-hop delay and/or loss measurement. In some embodiments, the end-to-end measurement may also include recording the measurement information on each intermediate node on the path. Referring to FIG. 4, FIG. 4 is a simplified diagram illustrating network 100 in which other techniques for in-situ passive PM may be implemented, according to an example embodiment. In particular, the embodiment of FIG. 4 illustrates details associated with an example hop-by-hop LM performed within network 100.

Different measurement types can be performed for an SR Policy by changing the PLI to indicate a different measurement type. As noted, the measurement type may be but not limited to end-to-end measurement, hop-by-hop measurement, or hop-by-hop recording with end-to-end measurement. Consider an example for FIG. 4 in which a hop-by-hop in-situ passive measurement is to be performed for packet flow or traffic 112 that originates from customer edge node 101. Further for the present example, consider that an SR Policy label 123 associated with the SR Policy {16105} for a PM associated with flow 112 is stored on first network element 102 that is to be used for performing LM for a first measurement interval, and that a PLI of a type {PLI(2)} is configured on first network element 102, which indicates a hop-by-hop PM type and PM metadata type indicates a LM type.

In this example, first data packet 114 is received by first network element 102, in which first network element 102 determines that measurement information is to be collected for first data packet 114 based on matching the data packet to an ACL configured for SR Policy {16105} associated with a hop-by-hop measurement for LM and determining that a given measurement interval is active for the packet flow associated with SR Policy {16105}. Based on the determination, first network element adds an MPLS label stack 420 to data packet 114 in which the top label 121 includes the {24134} label and the next label 122 includes the {24145} label as discussed previously. SR Policy label 123 of MPLS label stack 420 identifies the active SR Policy label for the given measurement interval with SR Policy label {16105}. Further, PLI 124 indicating the hop-by-hop PM type {PLI (2)} and PM metadata 125 indicating a LM metadata type are added to MPLS label stack 420 of first data packet 114 for a performance loss measurement of the packet flow 112. For the present example, PM metadata 125 includes a Session Identifier, a TX traffic-counter value, and a sequence number. The TX traffic-counter value may be expressed in number of packets or bytes. In some embodiments, a TX timestamp may also be included, as discussed herein.

First network element 102 forwards data packet 114, including MPLS label stack 420, after removing the top label 121, to first intermediate network element 103. The first intermediate network element 103 walks the entire MPLS label stack of the data packet and checks PLI 124 indicating {PLI(2)} (e.g., enabling hop-by-hop PM) and determines, based on the {PLI(2)} measurement type, and LM metadata type, that it is to copy the SR Policy label {16105} and PM metadata 125 in a local buffer header, collect measurement information such as an RX traffic-counter value at first intermediate network element 103 associated with data packet 114 (e.g., from a traffic counter operating on first intermediate network element 103), copy the RX traffic-counter value into the local buffer header, and further process the buffer header using the performance measurement process operating in the control-plane of first intermediate network element 103. A traffic-counter value may be measured in number of packets or bytes.

Based on the performance measurement type identified based on {PLI(2)}, the performance measurement process for first intermediate network element 103 performs one or more PM related actions including, but not limited to, identifying the active SR Policy label based on label 123 (e.g., SR Policy label {16105}) and computing a packet loss for the SR Policy using the collected RX traffic-counter value and the TX traffic-counter value included in PM metadata 125. As noted previously, the TX traffic-counter value carried in the PM metadata 125 is for the in-active SR Policy label (e.g., the SR Policy label that is not currently active to carry traffic). The mechanism for reporting probe reply messages may be the same for transit nodes of an SR Policy as for an egress node of the SR Policy. Thus, first intermediate network element 103 sends an IP/UDP probe reply message 416 to the ingress node with the source IP address field in the IP header set to the node address of first intermediate network element 103, the destination IP address field set to the node address of first network element 102 (e.g., Ingress Node-ID), the Session Identifier field set to the SR Policy label {16105} or, alternatively, to the received Session Identifier value in the metadata, and includes the TX traffic-counter value (as was included in the PM metadata) and the RX traffic counter value in the reply message according to the RFC 6374 packet format, as discussed above. First intermediate network element 103 then forwards first data packet 114 to second intermediate network element 104.

For the example of FIG. 4, second intermediate network element 104 checks PLI 124 indicating {PLI(2)} (e.g., enabling hop-by-hop PM) and determines, based on the {PLI(2)} measurement type and LM metadata type that it is to copy the SR Policy label {16105} and PM metadata 125 in a local buffer header, collect measurement information such as an RX traffic-counter value at second intermediate network element 104 associated with data packet 114 (e.g., from a traffic counter operating on second intermediate network element 104), copy the RX traffic-counter value into the local buffer header, and further process the buffer header using the performance measurement process operating in the control-plane of second intermediate network element 104. A traffic-counter value may be measured in number of packets or bytes.

Based on the performance measurement type identified based on {PLI(2)}, the performance measurement process for second intermediate network element 104 performs one or more PM related actions including, but not limited to, identifying the active SR Policy label based on label 123 (e.g., SR Policy label {16105}) and computing a packet loss for the SR Policy using the collected RX traffic-counter value and the TX traffic-counter value included in PM metadata 125. As noted previously, the TX traffic-counter value carried in the PM metadata 125 is for the in-active SR Policy label (e.g., the SR Policy label that is not currently active to carry traffic). The mechanism for reporting probe reply messages may be the same for transit nodes of an SR Policy as for an egress node of the SR Policy. Thus, second intermediate network element 104 sends an IP/UDP probe reply message 417 to the ingress node with the source IP address field in the IP header set to the node address of second intermediate network element 104, the Session Identifier field set to the SR Policy label {16105} or, alternatively, to the received Session Identifier value in the metadata, and includes the TX traffic-counter value (as was included in the PM metadata) and the RX traffic counter value in the reply message according to the RFC 6374 packet format, as discussed above. Second intermediate network element 104 then forwards data packet 114 to second network element 105.

Second network element 105 performs similar operations on data packet 114 and sends an IP/UDP reply message 418 to the ingress node with the source IP address field in the IP header set to the node address of second network element 105, the destination IP address field in the IP header set to the node address of first network element 102, the Session Identifier field set to the SR Policy label {16105} or, alternatively, to the received Session Identifier value in the metadata, and includes the TX traffic-counter value and an RX traffic-counter value as collected at second network element 105. Data packet 114 is then forwarded downstream to second customer edge node 106 after removing MPLS label stack 420 (e.g., removing SR Policy label 123, PLI 124, and PM metadata 125). Thus, as illustrated by the example in FIG. 4, hop-by-hop measurements may be performed for a network for a measurement type.

In still some embodiments, another variant solution may be implemented for PoT use cases, which involve hop-by-hop recording for PM metadata with an end-to-end measurement. For example, another PLI, say {PLI(3)} may be used to identify PM actions in which ingress and transit nodes of an SR Policy may perform 'insert node address, timestamp' operations in which a node inserts its node address and measurement information into PM metadata carried with a packet and forwards the data packet on the data path that supports this special label/functionality. In another example embodiment, a node may insert a count value or local sequence number into PM metadata.

Figure 5:
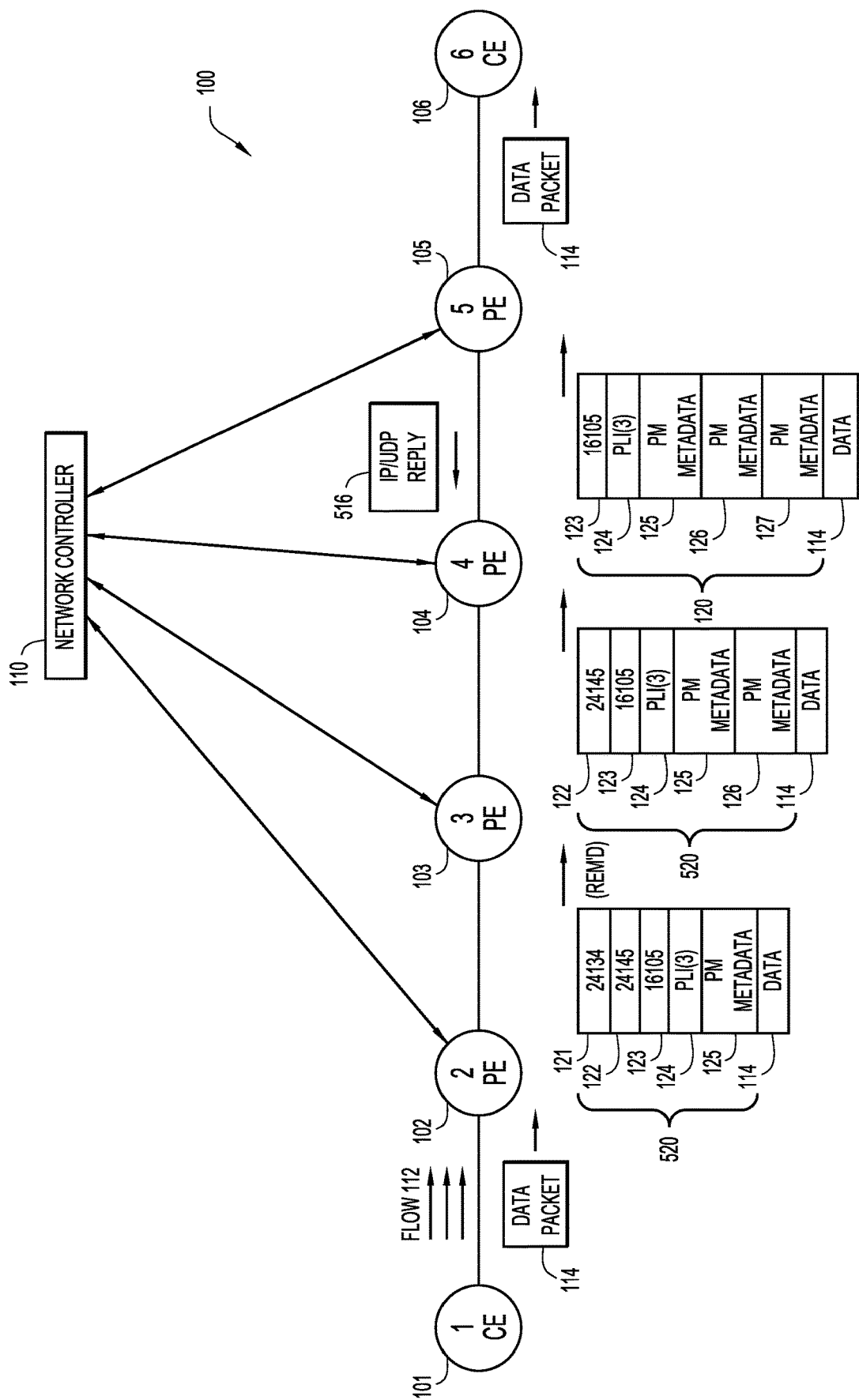
FIG. 5 is a simplified diagram illustrating the network of FIG. 1 in which other techniques for in-situ passive performance measurement may be implemented, according to an example embodiment.

Referring to FIG. 5, FIG. 5 is a simplified diagram illustrating network 100 in which other techniques for in-situ passive PM may be implemented, according to an example embodiment. In particular, the embodiment of FIG. 5 illustrates details associated with hop-by-hop recording with end-to-end measurement performed within network 100. For the embodiment of FIG. 5, consider that first network element 102 receives first data packet 114 and determines, based on matching information for first data packet 114 to an ACL configured for SR Policy {16105} that is associated with hop-by-hop recording with end-to-end measurement for DM (for this example) is to be performed.

Based on the determination, first network element 102 (e.g., the ingress node) adds an MPLS label stack 520 to data packet 114 in which the top label 121 includes the {24134} label and the next label 122 includes the {24145} label as discussed previously. SR Policy label 123 of MPLS label stack 520 identifies the active SR Policy label for the given measurement interval with SR Policy label {16105}. Further, PLI 124 indicating the hop-by-hop recording with end-to-end PM type {PLI(3)} and PM metadata 125 indicating a DM metadata type are added to MPLS label stack 520 of first data packet 114. For the present example, PM metadata 125 includes a Session Identifier, a TX timestamp, and a sequence number. In some embodiments, a RX timestamp may also be included in PM metadata 125.

First network element 102 forwards data packet 114, including MPLS label stack 520, after removing the top label 121, to first intermediate network element 103. The first intermediate network element 103 walks the entire MPLS label stack of the data packet and checks PLI 124 indicating {PLI(3)} and determines, based on the {PLI(3)} measurement type and the DM metadata type, that it is to perform one or more measurement related actions including: collecting an RX timestamp associated with receiving first data packet 114, adding PM metadata 126 to MPLS label stack 520 including the collected RX timestamp, and forwarding first data packet 114 to second intermediate network element 104. In some embodiments, first intermediate network 103 may additionally include its Node-ID and a TX timestamp for first data packet 114 in PM metadata 126.

Second intermediate network element 104 pops label 122 and performs similar actions based on determining {PLI(3)} and the DM metadata type including: collected an RX timestamp associated with receiving first data packet 114, adding PM metadata 127 to MPLS label stack 520 including the collected RX timestamp, and forwarding first data packet 114 to second network element 105. In some embodiments, second intermediate network 104 may additionally include its Node-ID and a TX timestamp for first data packet 114 in PM metadata 127.

Second network element 105 receives data packet 114 and determines based on {PLI(3)} and the DM metadata type in MPLS label stack 520 that it is to collect an RX timestamp for first data packet 114 and send an IP/UDP reply message 516 to the ingress node with the source IP address field in the IP header set to the node address of second network element, Session Identifier set to the SR Policy label {16105} or, alternatively to the received Session Identifier in PM metadata 125, and includes the TX timestamp (as included in PM metadata 125 by the ingress nodes), each RX timestamp as included PM metadata 126, 127 by each transit node, and the RX timestamp as collected by second network element 105. Data packet 114 is then forwarded downstream to second customer edge node 106 after removing MPLS label stack 520 (e.g., removing SR Policy label 123, PLI 124, and PM metadata 125, 126, 127). Thus, as illustrated by the example in FIG. 5, hop-by-hop recording with end-to-end measurements may be performed for a network.

Figure 6:
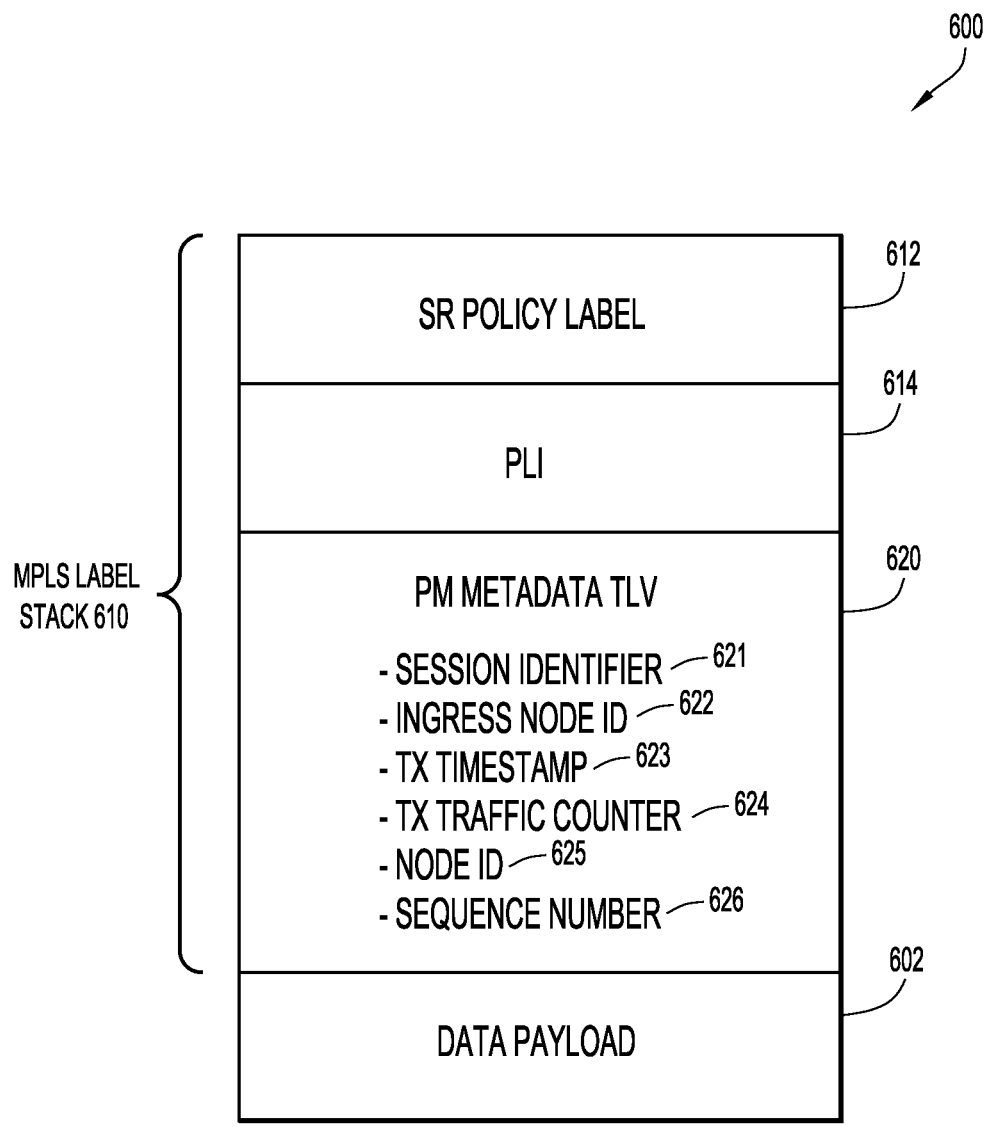
FIG. 6 is a simplified diagram illustrating example details associated with a Multiprotocol Label Switching (MLS) label stack, according to an example embodiment.

Referring to FIG. 6, FIG. 6 is a simplified diagram 600 illustrating example details of an MPLS label stack 610 for a data packet 602, according to an example embodiment. In some instances, a data packet (e.g., data packet 602) may be considered a data payload upon which an MPLS label stack (e.g., MPLS label stack 610) is imposed or appended to enable SR-MPLS routing according to an SR Policy. Data packet 602 may include its own routing information, for example, an IP header (not shown), which enables routing for the packet once MPLS label stack 610 is removed.

MPLS label stack 610 includes an SR Policy label 612 (e.g., a policy indicator), a PLI 614, and a PM Metadata TLV 620. SR Policy label 612 can be allocated by the egress node of an SR Policy to identify the SR Policy and PLI can be set to identify a performance measurement type, as discussed herein.

PM Metadata TLV 620 includes various fields including, but not limited to, a Session Identifier field 621, an Ingress Node-ID field 622, a TX Timestamp field 623, a TX traffic-counter field 624, a Node-ID field 625, and a Sequence Number field 626. For the embodiment of FIG. 6, Session Identifier field 621 can include a Session Identifier as set by an ingress node of an SR Policy, Ingress Node-ID field 622 can be set to the node address of the ingress node, TX Timestamp field 629 can include a TX timestamp as determined by the ingress node, TX traffic-counter field 626 can include a TX traffic-counter value as determined by the ingress node (for the in-active SR Policy label for a given measurement interval), and the Sequence Number field 628 can include a sequence number value associated with data packet 602. In some embodiments, the Node-ID field 625 can be set by a transit node to indicate the node address of the transit node (e.g., for hop-by-hop recording with end-to-end measurement). Thus, for the present example, one or more measurement fields provided for data packet 602 include SR Policy label 612, PLI 614, and PM Metadata TLV 620 carrying metadata such as a Session Identifier, an Ingress Node-ID, a TX timestamp, a TX traffic-counter value, and a sequence number. In at least one embodiment, a PM Metadata TLV carrying both delay measurement data and loss measurement data (e.g., PM Metadata TLV 620) may of a Type indicating a delay and loss measurement type (e.g., DM+LM TLV).

Figure 7:
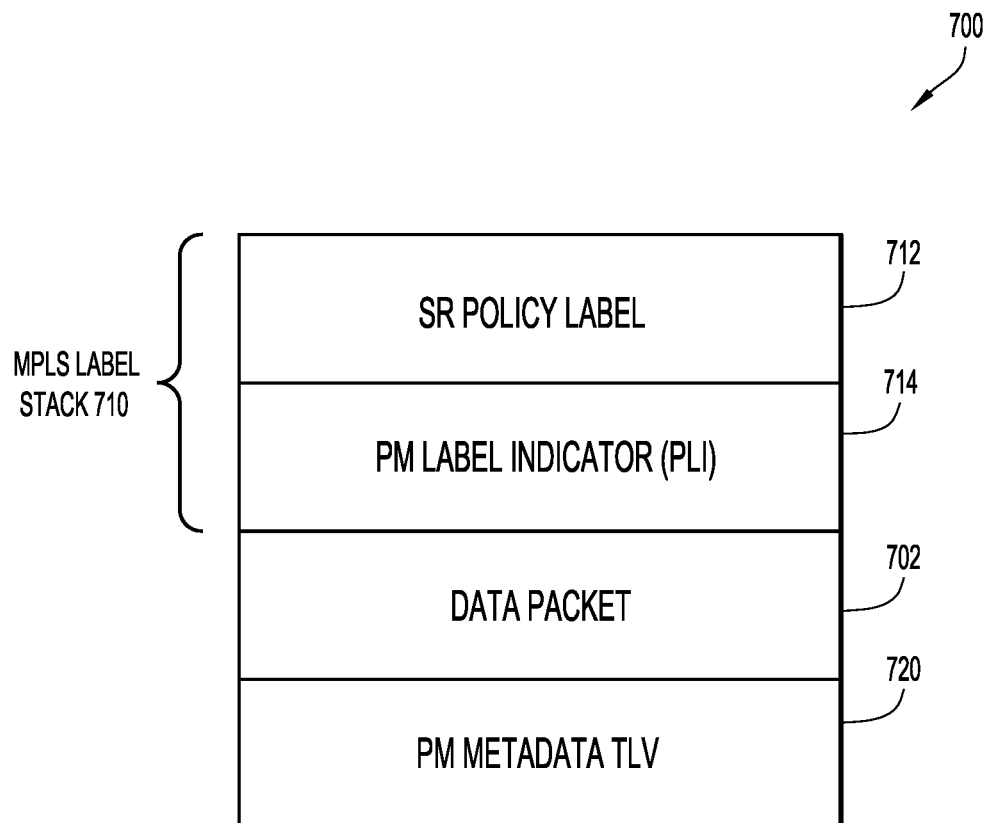
FIG. 7 is a simplified diagram illustrating example details associated with a performance measurement (PM) metadata Type-Length-Value (TLV) element, according to an example embodiment.

In some embodiments, PM metadata may be included at the end of a data packet rather than between the PLI of an MPLS label stack and the data packet. For example, in some cases, there may be size issues or constraints that may limit the size of an MPLS label stack that can be used for an SR-MPLS network. Referring to FIG. 7, FIG. 7 is a simplified diagram 700 illustrating example details of a PM Metadata TLV 720 for a data packet 702, according to an example embodiment. An MPLS label stack 710 is provided for data packet 702. Data packet 702 may include its own routing information, for example, an IP header (not shown), which enables routing for the packet once MPLS label stack 710 is removed.

MPLS label stack includes an SR Policy label 712 (e.g., a policy indicator) and a PLI 714. SR Policy label 712 can be allocated by the egress node of an SR Policy to identify the SR Policy and PLI 714 can be set to identify a performance measurement type, as discussed herein. For the embodiment of FIG. 7, PM Metadata TLV 720 is added after data packet 702 (e.g., the data payload) instead of within MPLS label stack 710 to provide a work-around for any potential label stack size issues.

The IP Header Length (HL) field and/or the Cyclic Redundancy Check (CRC) of data packet 702 are not modified for the embodiment of FIG. 7. In addition, the solution does not require any changes to ECMP routing and/or hashing function(s) that may be used for routing data packet 702 when using either MPLS label stack 710 or the IP header right after the PLI, which may include an End-of-Stack (EOS) flag (e.g., a bit in the PLI) set to 1. Thus, for the present example, one or more measurement fields provided for data packet 702 include SR Policy label 712, PLI 714, and PM Metadata TLV 720 provided at the end of the data payload.

Figure 8:
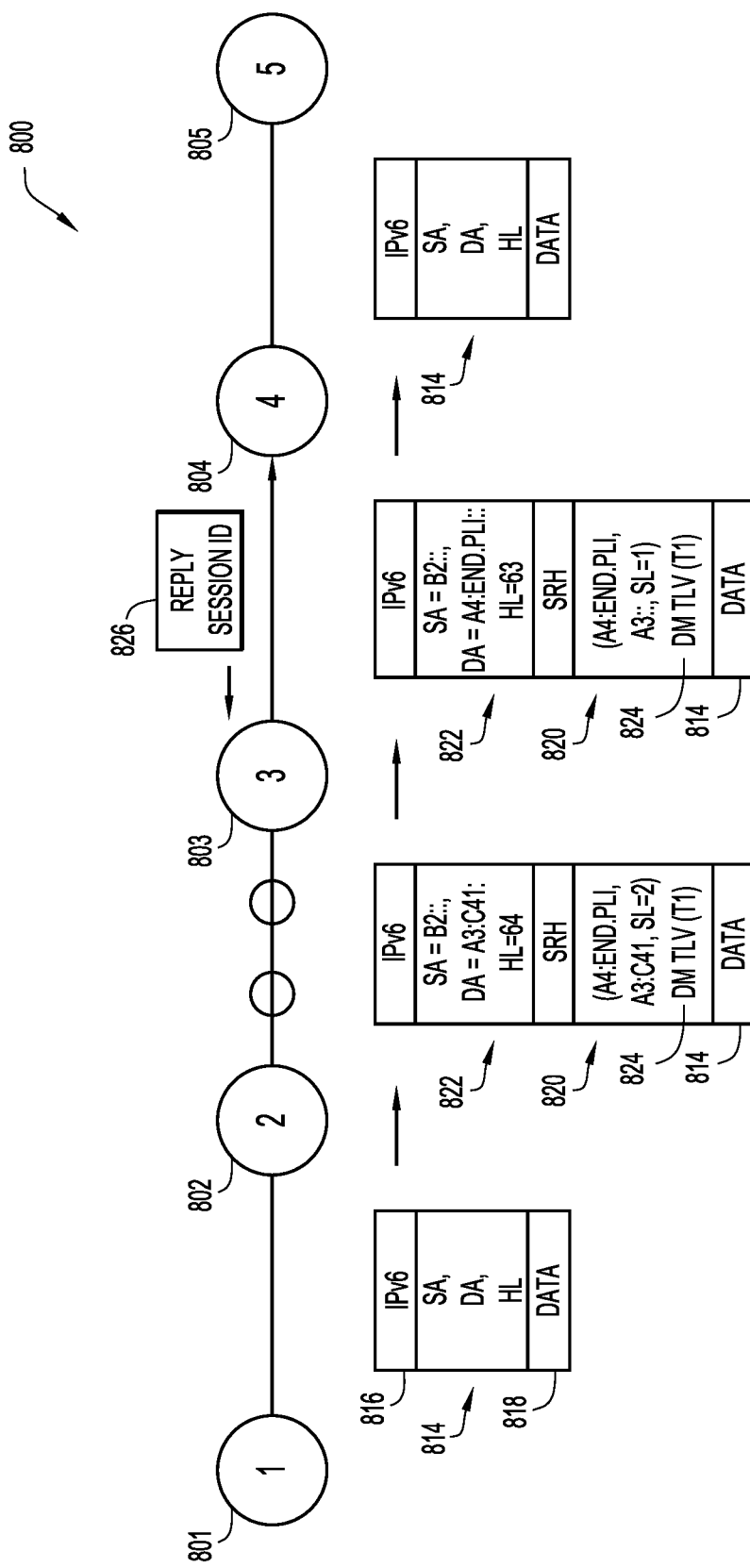
FIG. 8 is a simplified diagram illustrating another network in which techniques for in-situ passive performance measurement may be implemented, according to an example embodiment.

As noted previously, embodiments of the present disclosure can be applied to SR-MPLS networks or SRv6 networks. For example, an SR Policy can be created for SR-MPLS or SRv6 data-planes using MPLS Labels as SIDs or SRv6 SIDs, respectively. Referring to FIG. 8, FIG. 8 is a simplified diagram illustrating another network 800 in which techniques for in-situ passive performance measurement may be implemented, according to an example embodiment. Consider for the embodiment of FIG. 8 that network 800 is an SRv6 SDN in which DM are to be performed.

In at least one embodiment, network 800, as shown in FIG. 8, may include a plurality of network elements or nodes including a first customer edge node 801, a first network element 802, an intermediate network element 103, a second network element 804, and a second customer edge node 105. In this embodiment, customer edge nodes 801, 806 may be network elements (e.g., routers) that are located on a customer's premises that provide an interface to/from a provider's core network. For example, in this embodiment, the provider's core network may be represented by first network element 802, intermediate network element 103, and second network element 804 of network 100. Additionally, network 100 may further include a network controller (not shown) that provides monitoring, control, and/or management operations for one or more components of network 800.

In the embodiment of FIG. 8, a first packet 814 of a packet flow or traffic originates from first customer edge node 801. The first packet 814 includes an IPv6 header 816, which will be referred to herein as 'inner IPv6 header 816' and a data payload 818. In this embodiment, first packet 814 is received by first network element 802, where a Segment Routing Header (SRH) 820 is added to first packet 814 and an outer IPv6 header 822 is also added to first packet 114. First network element 802 is the ingress node for the SRv6 policy, for example. Accordingly, the SRv6 Policy is instantiated by first network element 802, which is considered the ingress node for the SRv6 Policy.

The outer IPv6 header 822 of first packet 814 allows first network element 802 to customize one of more fields in of the header to enable the functionality of the techniques for in-situ passive performance measurement described herein without affecting inner IPv6 header 816 that is already present in first packet 814 from customer edge node 801. Data traffic for the present example is forwarded on the SRv6 Policy from the ingress node (first network element 802) to the egress node (second network element 804). Outer IPv6 header 822 includes one or more fields including, but not limited to, a source address (SA) field, a destination address (DA) field, and a header length (HL) field.

The techniques for in-situ passive performance measurement described herein include a Segment Identifier (SID) Function END.PLI that is added for the target SID value in the SID list to which a measurement type, such as an end-to-end measurement for this example, is to be measured. The value for the END.PLI SID Function is advertised via the Internal Gateway Protocol (IGP) by the egress node, for example, second network element 804, which is identified as {A4:} in this example, provided in SRH 820. A DM TLV element 824 indicating a delay measurement is added by the ingress node (e.g., first network element 802) in SRH 820 that contains the SR Policy Session Identifier (to identify the SR Policy on the ingress node) and the ingress node address. A TX timestamp (T1) is also added into DM TLV 824 in SRH 820. Thus, for the present example, one or more measurement fields provided for first packet 814 include SRH 820 that includes the value for the END.PLI SID Function indicating the end-to-end measurement type and DM TLV 824 in SRH 820 indicating a delay measurement. In various embodiments, the SID Function END.PLI can be configured to enable In-Situ passive performance measurement for end-to-end measurement, hop-by-hop measurement, or hop-by-hop recording with end-to-end measurement.

As packet traverses intermediate network element 803, outer IPv6 header 822 is updated to include, among other information, the destination address {DA=A4:END.PLI} and the segments left (SL) in SRH 820 is updated to SL=1. Thus, outer IPv6 header 822 can also be augmented with one or more measurement fields. Intermediate network element 803 is the penultimate segment for the present example. Due to presence of {An:END.PLI} SID in SRH 820 and/or due to the presence of a DM, LM, DM+LM, and/or node address TLV in SRH 820, Penultimate Segment Pop (PSP) behavior at intermediate network element 803 is disabled.

The egress node (e.g., second network element 804) due to the END.PLI SID function, specifically performs various in-situ PM related actions including, but not limited to, copying the content of DM TLV 824 in the local buffer header, adding measurement information, such as an RX timestamp (T2), in the local buffer header and punting the copy of the packet header along with the local buffer header to the control-plane. Additionally, the egress node sends an IP/UDP reply message 826, including the Session Identifier, TX timestamp (T1), and RX timestamp (T2) to the ingress node (e.g., first network element 802) or to a network controller (e.g., 110, as shown in FIG. 1). The ingress node may perform one or more PM related actions, as discussed herein, upon receiving IP/UDP reply message 826. Data packet 814 is simply forwarded downstream by second network element 804.

In some embodiments, for loss measurement, for example, an LM TLV (containing traffic-counter values) is added in the SRH. In still some embodiments in which both delay and loss measurement are enabled for a network, a combined DM+LM TLV (that contains both timestamps and traffic counters) can be added in the SRH. In still some embodiments, a node address TLV (containing node addresses) can be added in in the SRH for PoT use-cases. In some embodiments, the node address TLV can be used along with DM and/or LM TLVs in the SRH of the data traffic.

In some embodiments, SID Function END.PLI is not required and the presence of DM, LM, DM+LM, and/or node address TLV(s) in the SRH can be used for enabling in-situ passive performance measurement. In still some embodiments, the SID Function END.PLI is used with intermediate network node SIDs in addition to DM, LM, DM+LM, and/or node address TLV(s) in the SRH for hop-by-hop in-situ performance measurements. In still some embodiments, as noted above, the SID Function END.PLI enables In-Situ performance for end-to-end measurement, or hop-by-hop measurement or hop-by-hop recording with end-to-end measurement in an SRv6 network.

Embodiments of the present disclosure can also be applied to Service Function Chaining (SFC) implementations. Such embodiments may provide for the ability to define an in-situ passive mode of PM as a SFC for actual data traffic traversing the SFC by adding a PLI and PM metadata into an SR-MPLS header (e.g., MPLS label stack) for SR Policies, as discussed herein. The PM metadata (e.g., timestamp(s), traffic-counter value(s), node address(es), etc.) is carried in the actual data traffic that eliminates the need for control-plane based probe queries.

Figure 9:
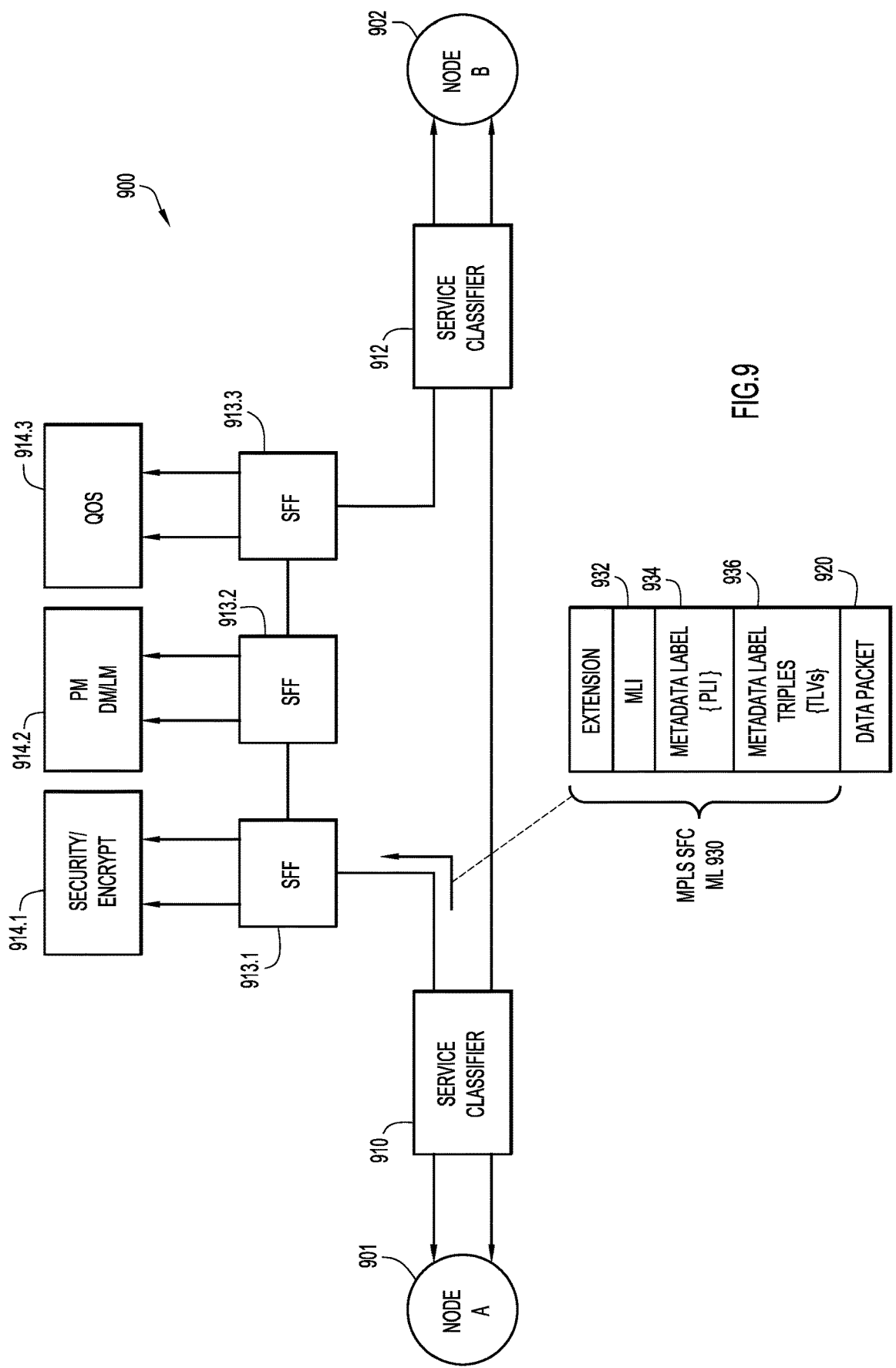
FIG. 9 is a simplified diagram illustrating a Service Function Chaining (SFC) implementation in which techniques for in-situ passive performance measurement may be implemented, according to an example embodiment.

Referring to FIG. 9, FIG. 9 is a simplified diagram illustrating a network 900 in which techniques for in-situ passive performance measurement may be implemented, according to an example embodiment. As illustrated in FIG. 9, network 900 includes a first node 901, a second node 902, a first service classifier 910, a second service classifier 912, and various service functions (SFs) including, a security/encryption SF 914.1, a PM DM/LM SF 914.2, and a QoS SF 914.3 in which each SF is interconnected via SFFs including a first SFF 913.1 associated with security/encryption SF 914.1, a second SFF 913.2 associated with PM DM/LM SF 914.2, and a third SFF 913.3 associated with QoS SF 914.3. In at least one embodiment, SF 914.1-914.3 are within a network node.

For the embodiment of FIG. 9, in-situ passive performance measurement can be implemented by PM DM/LM SF 914.2 via SR-MPLS or SRv6 using techniques for in-situ passive performance measurement, as discussed herein. For example, for SR-MPLS can be used by including an MPLS label stack for SFC according to a format as provided in "tools.ietf.org/pdf/draft-ietf-mpls-sfc-04.pdf".

For example, a first data packet 920 for a packet flow or traffic, can be augmented with an MPLS SFC metadata label (ML) 930 that includes one or more fields including, but not limited to, a metadata label indicator (MLI) 932, which includes a value as set by the Internet Assigned Numbers Authority (IANA); a first a metadata label 934, which can carry a PLI; and one or more other metadata label triples 936, that can be configured as one or more PM metadata TLVs (e.g., DM TLV, LM TLV, DM+LM TLV, node address TLV, etc.), as discussed herein. First data packet 920 can carry additional headers according to various SFC network service header formats (e.g., tunnel labels, service path indictor, service index, etc.) One or more PM related actions can be performed via PM DM/LM SF 914.2 based on the PLI and/or TLVs, as discussed for various embodiments described herein.

In still some embodiments, techniques for in-situ passive performance measurement be implemented using in-situ PM for an EVPN environment.

Figure 10:
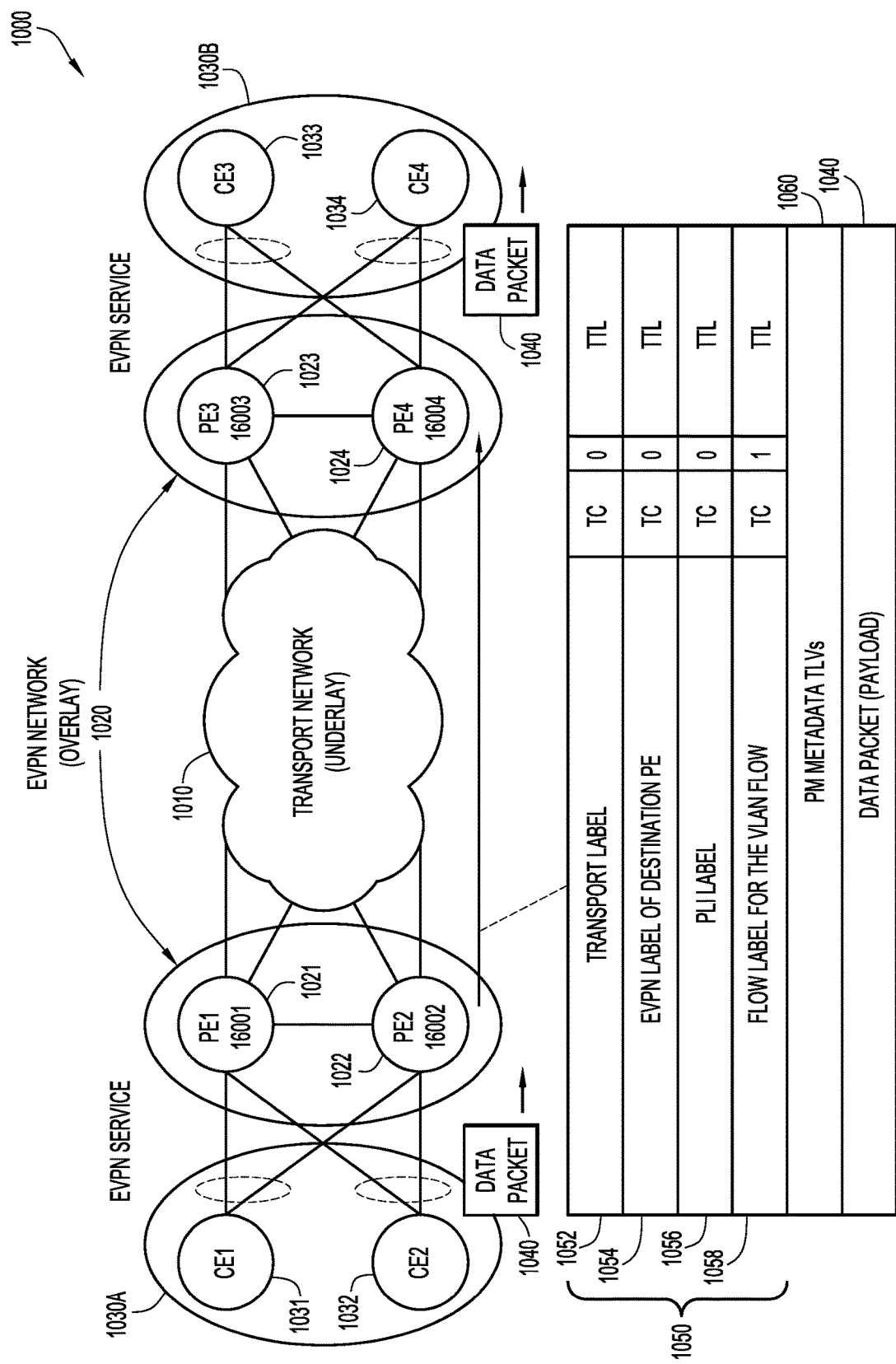
FIG. 10 is a simplified diagram illustrating another network in which techniques for in-situ passive performance measurement may be implemented, according to an example embodiment.

Referring to FIG. 10, FIG. 10 is a simplified diagram illustrating another network 1000 in which techniques for in-situ passive performance measurement may be implemented, according to an example embodiment. As illustrated in FIG. 10, network 1000 includes a transport network 1010 as the underlay for network 1000 and an EVPN network 1020 as an overlay for network 1000. EVPN network 1020 for the present example is considered the provider's core network, which includes a first provider edge (PE) node 1021, a second PE node 1022, a third PE node 1023, and a fourth PE node 1024. EVPN network 1020 provides an EVPN service to one or more customer networks 1030A, 1030B. Customer network 1030A includes a first customer edge (CE) node 1031 and second CE node 1032. Customer network 1030B includes a third CE node 1033 and a fourth CE node 1034.

Consider for the present example embodiment that second CE node 1032 sends a data packet 1040 that is to be delivered to fourth CE node 1034. In-situ PM for EVPN network 1020 can be provided between an ingress node, say second PE node 1022, and an egress node, say fourth PE node 1024. Upon receiving data packet 1040, the ingress imposition node (e.g., second PE node 1022) provides a label stack 1050 for the packet. Label stack 1050 includes various labels and/or fields including, but not limited to Transport label(s) 1052, an EVPN Label 1054 indicating the destination PE (e.g., fourth PE node 1024) a PLI 1056, and a Flow label 1058. One or more PM metadata TLV(s) 1060 are provided as In-situ PM data between label stack 1050 and data packet 1040.

Transport label(s) 1052 can be used for the segment routing for traffic engineering (SR-TE) Policy in the provider's core network carrying the EVPN service. In some embodiments, EVPN Label 1054 may be advertised by the egress node (e.g., fourth PE node 1024) for an EVPN instance via Multiprotocol Border Gateway Protocol (MP-BGP) or (BGP-SR Traffic Engineering (SRTE)) or by a PCE or some other signaling mechanism. Flow label 1058 is added by the ingress imposition node for load balancing (e.g., hashing) traffic. PLI 1056 can include a PLI and PM Metadata TLV(s) 1060 can include any delay, loss measurement, and/or node address TLVs (or combinations thereof), as discussed herein. PLI 1056 and PM Metadata TLV(s) 1060 are added by the ingress node to monitor this Layer 2 (L2) flow. The Flow label 1058 is added such that load balancing of the traffic is not affected by in-situ passive performance measurement. For example, in a 3-label hashing scheme, Flow label is added as a third label without EOS set, before the PLI label which is at the bottom with EOS set to 1. With bottom label hashing scheme, the Flow Label is added at the bottom of the stack with EOS bit set to 1 after PLI as shown in FIG. 10.

PM Metadata TLV(s) 1060 should not start using well-known protocol types to avoid IPv4/IPv6 header based hashing functions. In other words, if PM Metadata TLV(s) 1060 start with a well-known IP protocol type value (e.g., 0x4 or 0x6), a hashing function in packet forwarding may find it is an IP header and hash it incorrectly.

In some embodiments, an egress node may need to advertise the In-Situ passive performance measurement capability to an ingress node via BGP-SRTE or PCE or a network controller or some other signaling mechanism to avoid the ingress node sending PLI+metadata TLV(s) in the data packets to the egress node that can cause packet drop as the egress node is not programmed to support it. In one example for EVPN, the egress node can signal the PLI label to ingress nodes in a MP-BGP message with a PM flag enabled for end-to-end in-situ PM. This way ingress node knows that the egress node supports the EVPN in-situ PM capability and it can add the PM Metadata TLV(s) to data packets. In another example, for RSVP-TE LSP, the capability information may be signaled by the tail-end node to the head-end node in the RSVP Reservation (Resv) message.

PM Metadata TLV(s), as discussed for various embodiments described herein, may be inserted by the ingress node with pre-allocated buffer space such that each node can use an {index=number-of-labels present on the stack} to write to that {index} location in a PM Metadata TLV. For example, a node may write timestamp, traffic-counter value, and/or IP address information for a given index corresponding to the node. Consider, in one example, a 5 hop SR Policy. In this example, the ingress node may add metadata that contains 5 timestamps all initialized with some known values to indicate timestamps need to be written by each of the 5 hop nodes. In this manner, transit nodes do not need to manipulate the size of the metadata memory allocation. This is in particular used for the hop-by-hop recording with end-to-end measurement PLI type {PLI(3)}.

In still some embodiments, metadata may contain multiple TLVs with different types. For example, one TLV type may be for timestamps, another TLV type for sequence number, another for traffic-counter values, another type for traversed node addresses, and/or for any other information/parameters (e.g., as may be needed for Operations, Administration, and Maintenance (OAM) and/or SFC service functions). In still some embodiments, metadata may contain context information to uniquely identify an SR Policy and/or the ingress node for the policy, which may be used to facilitate sending PM information back to the ingress node.

Further, although certain embodiments herein describe the egress node collecting performance DM and/or LM information and sending information to the ingress node for any SR policy, in still some embodiments, the egress node may, in addition to or in lieu of sending to the information to the ingress node, send the information to an SDN controller (e.g., any network controller, etc. discussed herein and in the claims) via telemetry or via out-of-band IP/UDP messages.

Figure 11:
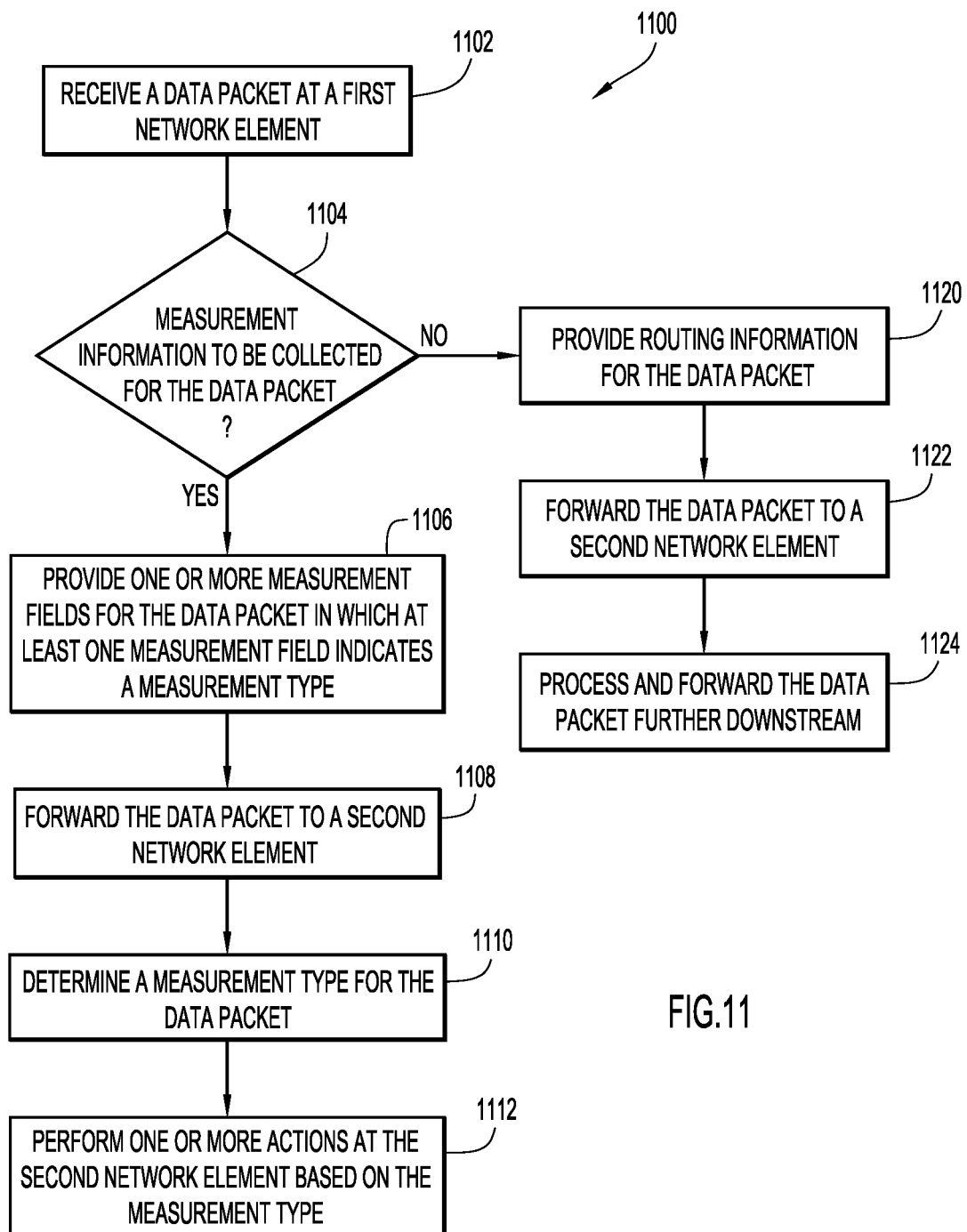
FIG. 11 is a simplified flowchart illustrating a method for implementing techniques for in-situ passive performance measurement, according to an example embodiment.

Referring to FIG. 11, FIG. 11 is a simplified flowchart illustrating a method 1100 for implementing techniques for in-situ passive performance measurement, according to an example embodiment. In this embodiment, method 1100 may be implemented by ingress node and egress nodes, and, in some embodiments (e.g., for hop-by-hop) measurements, by one or more transit nodes in a network, for example, a provider's first network element, second network element, and/or intermediate network elements, as described above.

In this embodiment, method 1100 may begin at an operation 1102 where a first network element or ingress node receives a data packet. For example, as shown in FIG. 1, first network element 102 may be the ingress node for traffic or packet flow 112 including a first data packet 114 from first customer edge node 101.

Next, at an operation 1104, method 1100 includes determining whether measurement information is to be collected for the data packet. For example, as shown in FIG. 1, first network element 102 may determine whether measurement information is to be collected for the packet flow based on comparing information for data packet 114 with one or more ACLs associated with one or more SR Policies configured on first network element. Other information (e.g., measurement interval) may be used to determine whether measurement information is to be collected for a packet.

Based on a determination at operation 1104 that no measurement information is to be collected for the data packet (e.g., the 5-tuple information for the packet does not match an ACL for a particular SR Policy label), method 1100 proceeds to an operation 1120 at which the first network element provides routing information for the data packet that enables the data packet to be routed through the network according to the SR Policy. In various embodiments, routing information may include, but not be limited to, SR-MPLS routing information (e.g., one or more labels for an MPLS label stack), SRv6 routing information (e.g., an outer IPv6 header and an SRH), EVPN routing information (e.g., Transport labels, an EVPN label, and a Flow label), RSVP signaled Traffic Engineering (TE) Label Switched Paths (LSPs) routing information, Label Distribution Protocol (LDP) routing information, among other routing information. For example, if no measurement information is to be collected for the packet, an MPLS label stack or an IPv6 outer header and SRH can be provided for the data packet to enable routing the data packet to the egress node for the SR Policy. Following the operations at 1120, method 1100 proceeds to at an operation 1122 at which the first network element forwards the data packet to a second network element. For example, the second network element may be transit node (e.g., intermediate network element 103 as shown in FIG. 1) or an egress node (e.g., second network element 105 as shown in FIG. 1). Method 1100 also includes an operation 1124 at which the second network element further processes the routing information forwards the data packet further downstream.

Returning to operation 1104, based on a determination at operation 1104 that measurement information is to be collected for the data packet (e.g., 5-tuple information for the packet matches an ACL for an SR Policy label), method 1100 proceeds to an operation 1106 at which the first network element provides one or more measurement fields to the data packet in which at least one field identifies a measurement type (e.g., a PLI, an SID Function, or the like). In various embodiments, one or more measurement fields may also include, but not be limited to, a policy indicator such as an SR policy label for an MPLS label stack, PM metadata TLV(s), (which may include one or more timestamps for delay measurement, one or more counter-values for loss measurement, one or more Node-IDs for PoT measurement, combinations thereof, etc.), among others, as discussed herein. The first network element may also provide routing information (e.g., SR-MPLS routing information, SRv6 routing information, etc.) for the data packet to enable the packet to be forwarded through the network.

Method 1100 further includes an operation 1108 at which the first network element forwards the data packet to a second network element (e.g., a transit node or the egress node). Next, method 1100 includes an operation 1110 at which the second network element determines a measurement type (e.g., end-to-end, hop-by-hop, or hop-by-hop recording with end-to-end) for the data packet using the PLI. For example, for an SR-MPLS implementation in which the second network element is an intermediate network element belonging to an SR Policy (e.g., a transit node such as second intermediate network element 104 of FIGS. 1 and 4) or an egress node (e.g., second network element 105 of FIGS. 1 and 4), the second network element determines a measurement type for a data packet by analyzing a PLI included in an MPLS label stack. In another example, for an SRv6 implementation in which the second network element is an egress node (e.g., second network element 804 of FIG. 8) or a transit node, the second network element may determine a measurement type based on an SID Function identified in the SRH.

Method 1100 further includes an operation 1112 at which the second network element performs one or more actions based on the measurement type. As discussed for various embodiments herein, one or more actions may include, but not be limited to, forwarding the data packet to another network element without collecting measurement information for the data packet (e.g., for an end-to-end measurement if the data packet is received by a transit node). Further as discussed for various embodiments herein, one or more actions may include any combination of one or more measurement related actions including, but not limited to, collecting at least one of a receive timestamp and a receive traffic-counter value and providing the collected values in a local buffer header, copying the data packet header and/or metadata included in the data packet into the local buffer header and punting the information to the control-plane, configuring an IP/UDP probe reply message with metadata included in the data packet, collected measurement information, and the SR Policy and sending the reply message to the ingress node, sending metadata and measurement information to an SDN controller, updating fields of a PM metadata TLV (e.g., hop-by-hop recording with end-to-end measurement), forwarding the data packet to another network element, removing routing information associated with an SR Policy, PLI and measurement metadata from the data packet (e.g., at the egress node) and forwarding the data packet to another network element (e.g., a customer edge node), among others, as discussed herein.

Clock Synchronization for One-Way Delay Measurement

For one-way delay measurement of an SR Policy, clocks need to be synchronized between the ingress and egress nodes of the SR Policy using PTP IEEE1588 protocol (or NTP for lesser accuracy). Typically, an operator needs to enable PTP on all devices along the path of an SR Policy for accurate clock synchronization. In case there is a node failure along the PTP clock synchronization path (e.g. failure of a transparent or boundary or master clock), all nodes typically need to re-synchronize the clock after finding a new master, during which time, clocks may be out-of-sync between the nodes, resulting in in-accurate delay measurement.

In order to avoid having to enable PTP on all nodes along an SR Policy path for accurate one-way delay measurement, an SDN controller (e.g., any network controller, etc. discussed herein and in the claims) can be used to provision the master (on the ingress node) and slave (on the egress node) PTP clocks, as well as SDN controller can act as a transparent clock to enabling PTP session between ingress and egress nodes of the SR Policy. This also helps when some devices do not support PTP clock synchronization in the network and for accurate one-way delay measurement. By using an SDN controller for synchronization the PTP clocks on the ingress and egress nodes of the SR Policy, not all nodes on the SR Policy path are required to support PTP protocol for accurate one-way delay measurement.

Figure 12B:
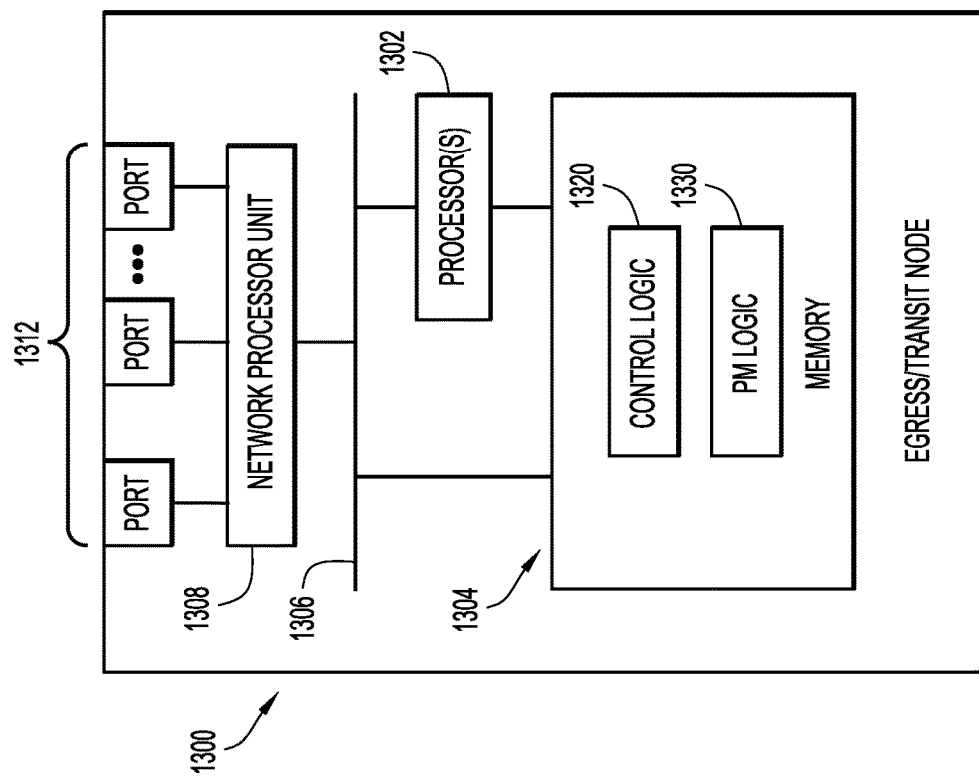
FIGS. 12A-12B are simplified block diagrams of network elements for implementing techniques for in-situ passive performance measurement, according to an example embodiment.
Figure 12A:
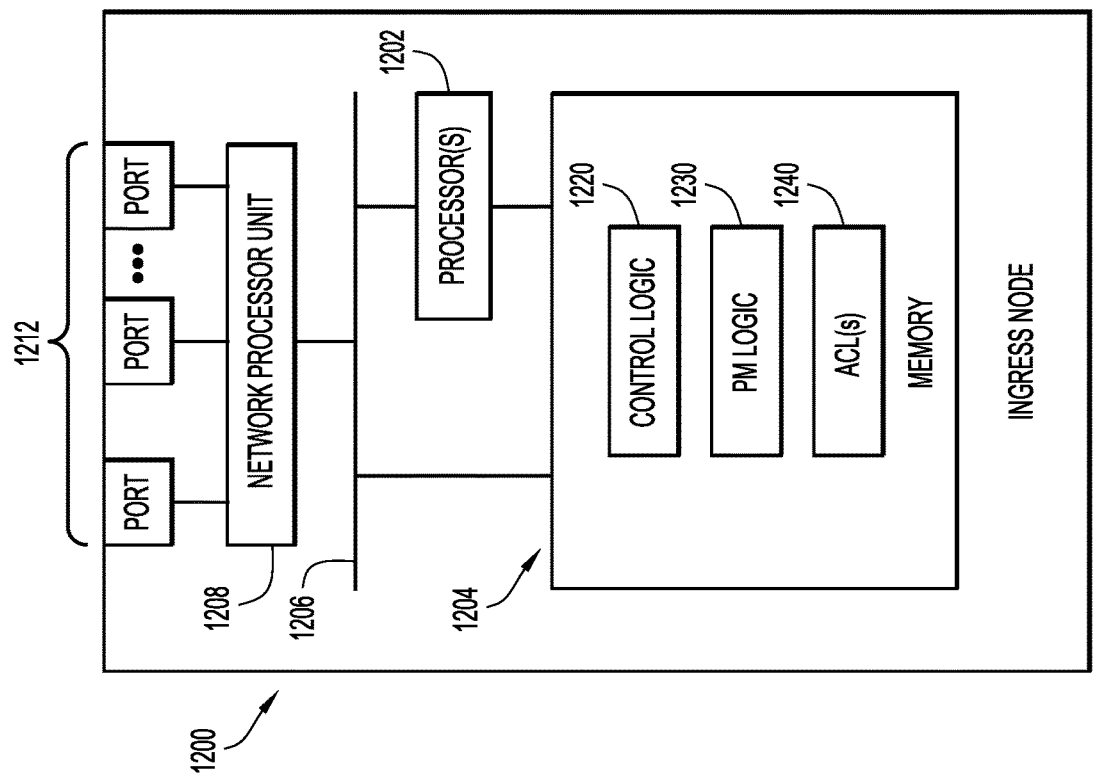

Referring to FIG. 12A, FIG. 12A is a simplified block diagram of a representative ingress node (network element) 1200 (e.g., first network element 102). Referring to FIG. 12B, FIG. 12B is a representative egress or transit (egress/transit) node (network element) 1300 (e.g., second network element 105 or an intermediate network element such as intermediate network element 405 in which hop-by-hop measurements can be performed). Other nodes (network elements) in networks described herein may have a similar configuration to perform in-situ passive performance measurement in a network environment.

In at least one embodiment, ingress node 1200, as shown in FIG. 12A, may include one or more processor(s) 1202, memory 1204, a bus 1206, and a network processor unit 1208. In at least one embodiment, processor 1202 is at least one hardware processor (e.g., microprocessor or microcontroller) configured to execute various tasks, operations, and/or functions for ingress node 1200 as described herein according to software and/or instructions configured for ingress node 1200. In at least one embodiment, memory 1204 configured to store data, information, software, instructions and/or logic associated with ingress node 1200 (e.g., data structures, logic, etc. may, in various embodiments, be stored using memory). For example, in at least one embodiment, one or more ACL(s) can be provisioned for memory 1204 in order for ingress node 1200 (e.g., processor(s), logic, software, etc.) to determine whether performance measurements are to be collected for a particular packet flow or traffic. Memory 1204 may also include a table, database, data structure, combinations thereof, or the like in which one or more SR Policies, SR Policy labels, SIDs, PLIs, SID Functions, measurement intervals, PM metadata TLVs, measurement information, measurement fields, routing information, telemetry statistics, packet buffers, or any other information as discusses herein to implement techniques associated with in-situ passive performance measurement.

In various embodiments, bus 1206 can be implemented with any architecture designed for passing data and/or control information between processors (such as microprocessors, communications and network processor units, etc.), memory, peripheral devices, and any other hardware components within a system. For example, bus 1206 can be implemented with one or more buses.

The network processor unit 1208 may include one or more Application Specific Integrated Circuits (ASICs), Linecards, etc., and facilitates network communications between the ingress node 1200 and other network nodes. Moreover, the network processor unit 1208 may, in some embodiments, be configured to encapsulate a packet to include a header such as an MPLS label or label stack, an IPv6 header, an SRH, an EVPN label or label stack, SFC labels, RSVP-TE LSP headers, LDP headers, and/or one or more PM metadata TLVs, to encapsulate a packet to include PM metadata TLV(s) following a data payload of a packet, to decapsulate a packet that includes any such headers, TLVs, etc., and/or to perform the operations described herein that would be performed by hardware. In some embodiments, encapsulation and/or decapsulation operations may be performed by software, logic, instructions, combinations thereof, or the like in combination with and/or separate from network processor unit 1208. Further, ingress node 1200 includes a plurality of network ports 1212 at which the ingress node 1200 receives packets and from which the ingress node 1200 sends packets into a network.

As noted, processor 1202 executes instructions associated with software and/or instructions stored in memory 1204. In at least one embodiment, memory 1204 stores instructions for control logic 1220 and Performance Measurement (PM) logic 1230. In at least one embodiment, PM logic 1230 may include instructions that, when executed (e.g., by processor(s) 1202), cause ingress node 1200 to perform operations including, but not limited to, determining whether measurement information is to be collected for one or more packets for a packet flow or traffic; instantiating an SR policy based on such determination; providing labels for a label stack or SRH including the PLI, the SR Policy label, SIDs, SID Functions, and/or PM metadata TLV(s) for measurement information that is to be collected; receiving measurement information in one or more probe reply messages; maintaining clocks, maintaining traffic-counter values for a packet flow or traffic; performing performance measurement calculations using measurement information; determining one or more actions based on performance measurement calculations, indications, etc.; cooperating with other logic, applications, etc.; combinations thereof; and/or the like to facilitate various operations as discussed for various embodiments described herein.

In at least one embodiment, control logic 1220 can include instructions that, when executed, cause ingress node 1200 to perform operations including, but not limited to, providing control operations of ingress node 1200; cooperating with other logic, applications, etc.; maintaining, managing, and/or otherwise interacting with data, information, parameters, etc. (e.g., memory, data structures, databases, tables, etc.); combinations thereof; and/or the like to facilitate various operations as discussed for various embodiments described herein.

It should be noted that in some embodiments, the control logic 1220 and/or PM logic 1230 may be implemented in the form of firmware implemented by one or more ASICs as part of the network processor unit 1210.

The memory 1204 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 1204 may comprise one or more tangible (non-transitory) computer readable storage media (e.g., a memory device) encoded with software comprising computer executable instructions and when the software is executed (by the processor 1202) it is operable to perform certain network node operations described herein.

Egress/transit node 1300, as shown in FIG. 12B, may include one or more processor(s) 1302, memory 1304, a bus 1306, and a network processor unit 1308. In at least one embodiment, processor 1302 is at least one hardware processor (e.g., microprocessor or microcontroller) configured to execute various tasks, operations, and/or functions for egress/transit node 1300 (e.g., for an SR Policy) as described herein according to software and/or instructions configured for egress/transit node 1300. In at least one embodiment, memory 1304 configured to store data, information, software, instructions and/or logic associated with egress/transit node 1300 (e.g., data structures, logic, etc. may, in various embodiments, be stored using memory). For example, in at least one embodiment, memory 1304 may also include a table, database, data structure, combinations thereof, or the like in which one or more SR Policies, SR Policy labels, SIDs, PLIs, SID Functions, measurement intervals, PM metadata TLVs, measurement information, measurement fields, routing information, telemetry statistics, packet buffers, or any other information as discusses herein to implement techniques associated with in-situ passive performance measurement.

In various embodiments, bus 1306 can be implemented with any architecture designed for passing data and/or control information between processors (such as microprocessors, communications and network processor units, etc.), memory, peripheral devices, and any other hardware components within a system. For example, bus 1206 can be implemented with one or more buses.

The network processor unit 1308 may include one or more ASICs, Linecards, etc., and facilitates network communications between the egress/transit node 1300 and other network nodes. Moreover, the network processor unit 1308 may, in some embodiments, be configured to encapsulate a packet to include a header such as an MPLS label or label stack, an IPv6 header, an SRH, an EVPN label or label stack, SFC label(s), RSVP-TE LSP headers, LDP headers, and/or one or more PM metadata TLVs, to encapsulate a packet to include PM metadata TLV(s) following a data payload of a packet, to decapsulate a packet that includes any such headers, TLVs, etc., and/or to perform the operations described herein that would be performed by hardware. In some embodiments, encapsulation and/or decapsulation operations may be performed by software, logic, instructions, combinations thereof, or the like in combination with and/or separate from network processor unit 1308. Further, egress/transit node 1300 includes a plurality of network ports 1310 at which the egress/transit node 1300 receives packets and from which the egress/transit node 1300 sends packets into a network.

As noted, processor 1302 executes instructions associated with software and/or instructions stored in memory 1304. In at least one embodiment, memory 1304 stores instructions for control logic 1320 and Performance Measurement (PM) logic 1330. In at least one embodiment, PM logic 1330 may include instructions that, when executed (e.g., by processor(s) 1202), cause egress/transit node 1300 to perform operations including, but not limited to, determining whether measurement information is to be collected for one or more packets for a packet flow or traffic (e.g., based on a PLI or SID Function and/or presence of PM Metadata TLVs); terminating an SR policy (e.g., for an egress node); removing and/or updating labels for a label stack, IPv6 header, and/or SRH; manipulating and/or removing PM metadata TLV(s) and/or information contained therein; configuring and sending probe reply messages; maintaining traffic-counter values for a packet flow or traffic; performing performance measurement calculations using measurement information; determining one or more actions based on performance measurement calculations; cooperating with other logic, applications, etc.; combinations thereof; and/or the like to facilitate various operations as discussed for various embodiments described herein.

In at least one embodiment, control logic 1320 can include instructions that, when executed, cause egress/transit node 1300 to perform operations including, but not limited to, providing control operations of egress/transit node 1300; cooperating with other logic, applications, etc.; maintaining, managing, and/or otherwise interacting with data, information, parameters, etc. (e.g., memory, data structures, databases, tables, etc.); combinations thereof; and/or the like to facilitate various operations as discussed for various embodiments described herein.

It should be noted that in some embodiments, the control logic 1320 and/or PM logic 1330 may be implemented in the form of firmware implemented by one or more ASICs as part of the network processor unit 1310.

The memory 1304 may include ROM of any type now known or hereinafter developed, random access memory RAM of any type now known or hereinafter developed, magnetic disk storage media devices, tamper-proof storage, optical storage media devices, flash memory devices, electrical, optical, or other physical/tangible memory storage devices. In general, the memory 1304 may comprise one or more tangible (non-transitory) computer readable storage media (e.g., a memory device) encoded with software comprising computer executable instructions and when the software is executed (by the processor 1302) it is operable to perform certain network node operations described herein.

Figure 13:
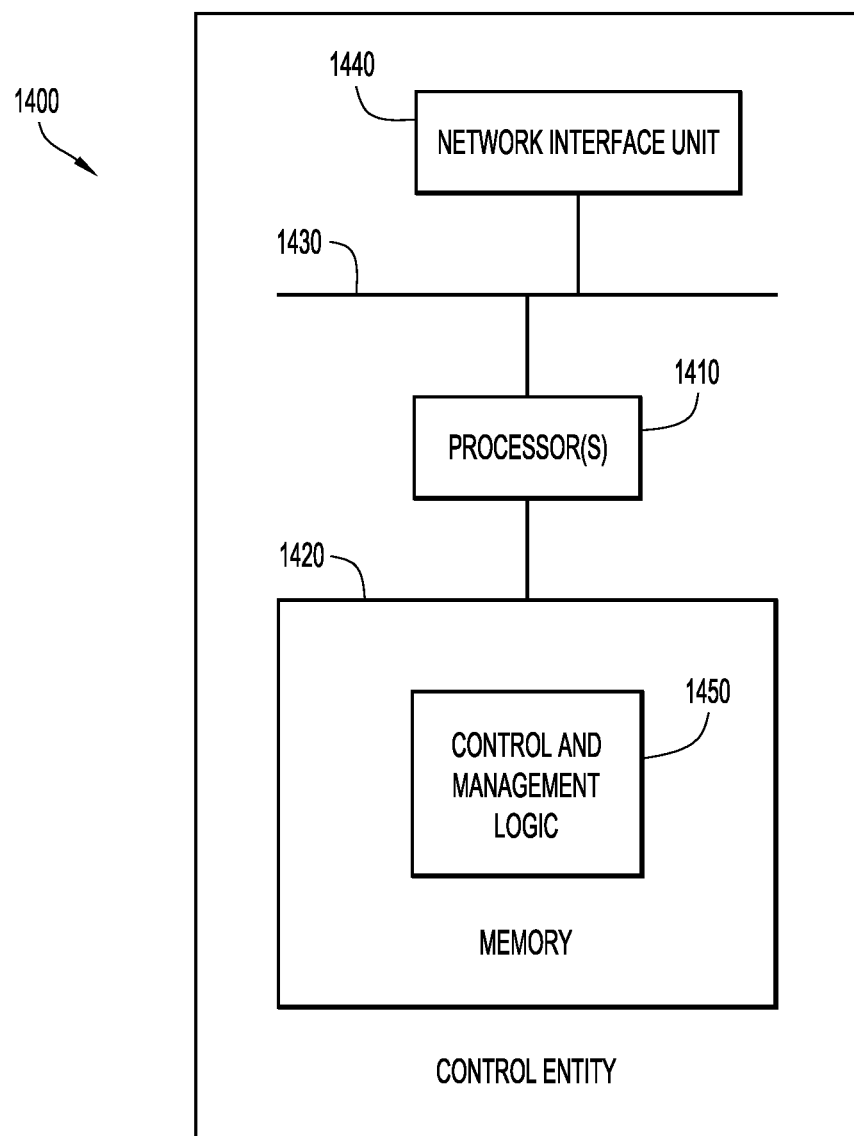
FIG. 13 is a simplified block diagram of a control entity configured to participate in the mechanisms presented herein, according to an example embodiment.

Referring to FIG. 13, FIG. 13 is a simplified block diagram illustrating a computing/control entity 1400 that may perform the functions of network controller shown in FIGS. 1 and 4. The computing/control entity 1400 includes one or more processors 1410, memory 1420, a bus 1430 and a network interface unit 1440, such as one or more network interface cards that enable network connectivity. The memory 1420 stores instructions for control and management logic 1450, that when executed by the processor 1410, cause the processor to perform the software defined network controller operations described herein. The memory 1420 may include ROM of any type now known or hereinafter developed, RAM of any type now known or hereinafter developed, magnetic disk storage media devices, tamper-proof storage, optical storage media devices, flash memory devices, electrical, optical, or other physical/tangible memory storage devices. In general, the memory 1420 may comprise one or more tangible (non-transitory) computer readable storage media (e.g., a memory device) encoded with software comprising computer executable instructions and when the software is executed (by the processor 1410) it is operable to perform the network controller operations described herein.

In summary, embodiments are presented herein that define in-situ passive mode of PM as a SFC implementation for actual data traffic by adding a SR Policy label, a PLI, and PM Metadata into SR-MPLS headers, an SRH for SRv6, into a label stack for EVPN for SR, into SFC labels, into RSVP-TE LSP headers, into LDP headers, or the like for SR Policies. The PM metadata (e.g., timestamp, traffic-counter, node address, etc.) is carried in the actual data traffic that eliminates the need for control-plane based probe queries. As the solution provided by embodiments described herein do not require a priori knowledge of the actual data traffic end-to-end ECMP forwarding path in the network, it can easily be used for monitoring a specific IP flow of an application/service by using an ACL, for end-to-end performance measurement (e.g., using a particular PLI), hop-by-hop performance measurement (using another particular PLI), and hop-by-hop recording with end-to-end measurement (using another PLI).

Several advantages or benefits are provided by the in-situ passive performance measurement embodiments illustrated and described herein. In at least one embodiment, one advantage is that the measures the delay (end-to-end and hop-by-hop) and loss performance of the actual customer data traffic. Another advantage is that the router-based solution does not rely on a controller based telemetry. Yet another advantage is that the solution does not require control-plane based probe queries or test traffic for performance delay/loss measurement of an SR Policy. Yet another advantage is that the solution does not require to know the path of the data traffic requiring performance measurement as no directed probe query messages are to be sent. Yet another advantage is that the solution does not require to copy the content of data payload to correlate PM data from different nodes. Yet another advantage is that the solution can be used by routers to quickly trigger protection switchover on the ingress node when performance degradation is seen upon receiving the IP/UDP message from the egress node or a transit node of an SR Policy or to steer affected customer traffic flow (matching the ACL) to a different SR Policy when the PM SLA is violated. Yet another advantage is that the solution can be seen as an extension of the SFC (that carries SFC metadata in an MPLS header) and can be easily integrated with SF aware implementations by adding a PM SF. Thus, the solution adds PM action as just another Service Function on a Service Function Chain. Yet another advantage is that the in-situ method does not suffer from the scale issues related to large number of end-to-end ECMP paths of an SR Policy that need monitoring.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

Note that in this disclosure, references to various features (e.g., elements, structures, nodes, modules, components, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic, or the like as used herein this Specification, can be inclusive of an executable file comprising instructions that can be understood and processed on a computer, processor, machine, compute node, combinations thereof, or the like and may further include library modules loaded during execution, object files, system files, hardware logic, software logic, and/or any other executable modules.

It is also important to note that the operations and steps described with reference to the preceding FIGS. illustrate only some of the possible scenarios that may be executed by, or within, a network (e.g., network 100). Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

A network, such as networks discussed herein, can comprise any number of hardware and/or software elements coupled to (and in communication with) each other through a communication medium. Such networks can include, but are not limited to, any local area network (LAN), virtual local area network (VLAN), wide area network (WAN) such as the Internet, wireless local area network (WLAN), metropolitan area network (MAN), Intranet, Extranet, virtual private network (VPN), any other appropriate architecture or system that facilitates communications in a network environment or any suitable combination thereof.

A network, such as networks discussed herein, through which communications propagate in can use any suitable technologies for communication including wireless (e.g., 3G/4G/5G/nG network, Institute of Electrical and Electronics Engineers (IEEE) Std 802.11™-2012, published Mar. 29, 2012, WiMax, IEEE Std 802.16™-2012, published Aug. 17, 2012, Radio-frequency Identification (RFID), Near Field Communication (NFC), Bluetooth™, etc.) and/or wired (e.g., T1 lines, T3 lines, digital subscriber lines (DSL), Ethernet, etc.) communication. Generally, any suitable means of communication may be used such as electric, sound, light, infrared, and/or radio.

Note that with the examples provided above, as well as numerous other examples provided herein, interactions may be described in terms of one, two, three, or four network elements. However, this has been done for purposes of clarity and example only. In certain cases, it may be easier to describe one or more of the functionalities by only referencing a limited number of network elements. It should be appreciated that networks discussed herein (and their teachings) are readily scalable and can accommodate a large number of components, as well as more complicated/sophisticated arrangements and configurations. Accordingly, the examples provided should not limit the scope or inhibit the broad teachings of networks discussed herein as potentially applied to a myriad of other architectures.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain protocols, networks discussed herein may be applicable to other exchanges or routing protocols, interfaces, and/or communications standards, proprietary and/or non-proprietary. Moreover, although networks described herein have been illustrated with reference to particular elements and operations that facilitate processes, these elements, and operations may be replaced by any suitable architecture or process that achieves the intended functionality of networks described herein.

What is claimed is:

1. A method comprising:
    obtaining a data packet at a second network element, wherein the data packet comprises a plurality of measurement fields including a first field including a measurement type, a second field including a policy indicator, and a third field including measurement metadata and wherein the measurement type is set by a first network element;
    based on the measurement type, collecting by the second network element at least one of a receive time and a receive count value for the data packet;
    configuring a message comprising at least a portion of measurement information included in the measurement metadata and at least one of the receive time and the receive count value collected for the data packet; and
    transmitting the message to the first network element or to a network controller.

2. The method of claim 1, wherein, based on the measurement type, the method includes:
    forwarding the data packet to a third network element after adding or updating the measurement metadata in the data packet based on the measurement type.

3. The method of claim 1, wherein the message further comprises:
    the policy indicator;
    a Session Identifier;
    an ingress node address; and
    a node address of the second network element.

4. The method of claim 1, wherein the measurement type and the policy indicator are provided for a header of the data packet and the measurement metadata is provided in one of the header of the data packet or before or after a data payload for the data packet.

5. The method of claim 1, wherein the measurement metadata comprises one or more of:
    a Session Identifier;
    an ingress node address;
    a transmit time for the data packet;
    a traversed node address;
    a transmit count value for the data packet; and
    a sequence number.

6. The method of claim 1, wherein the second network element is an egress network element for a provider network, the method further comprising:
    removing the plurality of measurement fields from the data packet; and
    forwarding the data packet to a third network element.

7. The method of claim 1, wherein at least a portion of the plurality of measurement fields are provided in a Segment Routing Header for the data packet.

8. The method of claim 1, wherein the second network element comprises one or more service functions for a service function chain.

9. The method of claim 1, wherein the first network element and the second network element are part of an Ethernet Virtual Private Network.

10. One or more non-transitory computer readable storage media encoded with instructions that, when executed by a processor, cause the processor to perform operations, comprising:

obtaining a data packet at a second network element, wherein the data packet comprises a plurality of measurement fields including a first field including a measurement type, a second field including a policy indicator, and a third field including measurement metadata and wherein the measurement type is set by a first network element;

based on the measurement type, collecting by the second network element at least one of a receive time and a receive count value for the data packet;

configuring a message comprising at least a portion of measurement information included in the measurement metadata and at least one of the receive time and the receive count value collected for the data packet; and transmitting the message to the first network element or to a network controller.

11. The media of claim 10, wherein, based on the measurement type, the instructions, when executed by the processor, cause the processor to perform further operations, comprising:

forwarding the data packet to a third network element after adding or updating the measurement metadata in the data packet based on the measurement type.

12. The media of claim 10, wherein the message further comprises:

the policy indicator;

a Session Identifier;

an ingress node address; and a node address of the second network element.

13. The media of claim 10, wherein the measurement type and the policy indicator are provided for a header of the data packet and the measurement metadata is provided in one of the header of the data packet or before or after a data payload for the data packet.

14. The media of claim 10, wherein the measurement metadata comprises one or more of:

a Session Identifier;

an ingress node address;

a transmit time for the data packet;

a traversed node address;

a transmit count value for the data packet; and a sequence number.

15. An apparatus comprising:

a plurality of network ports for sending and receiving packets;

a memory for storing data; and a processor for executing instructions associated with the data, wherein executing the instructions causes the apparatus to perform operations, comprising:

obtaining a data packet at the apparatus, wherein the apparatus is a second network element, wherein the data packet comprises a plurality of measurement fields including a first field including a measurement type, a second field including a policy indicator, and a third field including measurement metadata and wherein the measurement type is set by a first network element;

based on the measurement type, collecting by the second network element at least one of a receive time and a receive count value for the data packet;

configuring a message comprising at least a portion of measurement information included in the measurement metadata and at least one of the receive time and the receive count value collected for the data packet; and transmitting the message to the first network element or to a network controller.

16. The apparatus of claim 15, wherein, based on the measurement type, executing the instructions causes the apparatus to perform further operations, comprising:

forwarding the data packet to a third network element after adding or updating the measurement metadata in the data packet based on the measurement type.

17. The apparatus of claim 15, wherein the message further comprises:

the policy indicator;

a Session Identifier;

an ingress node address; and a node address of the second network element.

18. The apparatus of claim 15, wherein the measurement type and the policy indicator are provided for a header of the data packet and the measurement metadata is provided in one of the header of the data packet or before or after a data payload for the data packet.

19. The apparatus of claim 15, wherein the measurement metadata comprises one or more of:

a Session Identifier;

an ingress node address;

a transmit time for the data packet;

a traversed node address;

a transmit count value for the data packet; and a sequence number.

20. The apparatus of claim 15, wherein at least a portion of the plurality of measurement fields are provided in a Segment Routing Header for the data packet.

* * * * *